US012772018B2

(12) United States Patent
Thagadur Shivappa et al.

(10) Patent No.: US 12,772,018 B2
(45) Date of Patent: Oct. 20, 2026

(54) AUDIO PROCESSING

(71) Applicant: QUALCOMM Incorporated, San Diego, CA (US)

(72) Inventors: Shankar Thagadur Shivappa, San Diego, CA (US); Isaac Garcia Munoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 18/783,186

(22) Filed: Jul. 24, 2024

(65) Prior Publication Data

US 2025/0039628 A1 Jan. 30, 2025

Related U.S. Application Data

(60) Provisional application No. 63/515,648, filed on Jul. 26, 2023.

(51) Int. Cl.
*H04S 7/00* (2006.01)

(52) U.S. Cl.
CPC .......... *H04S 7/304* (2013.01); *H04S 2400/11* (2013.01)

(58) Field of Classification Search
CPC .. H04S 2400/11; H04S 7/304; H04S 2420/01; H04S 2400/13; H04S 7/303
See application file for complete search history.

(56) References Cited

U.S. PATENT DOCUMENTS

2021/0409888 A1 12/2021 Schevciw et al.
2023/0123809 A1 4/2023 Mate et al.

FOREIGN PATENT DOCUMENTS

WO 2018232327 A1 12/2018

OTHER PUBLICATIONS

International Search Report and Written Opinion—PCT/US2024/039548—ISA/EPO—Oct. 22, 2024.

*Primary Examiner* — Kile O Blair
(74) *Attorney, Agent, or Firm* — QUALCOMM Incorporated; Espartaco Diaz Hidalgo

(57) ABSTRACT

A device includes a memory configured to store data associated with an immersive audio environment and one or more processors configured to obtain pose data for a listener in the immersive audio environment. The processor(s) are configured to determine a current listener pose based on the pose data and one or more pose constraints. The processor(s) are configured to obtain pose data based on the pose update parameter. The processor(s) are configured to obtain, based on the current listener pose, a rendered asset associated with the immersive audio environment. The processor(s) are configured to generate an output audio signal based on the rendered asset.

20 Claims, 13 Drawing Sheets

AUDIO PROCESSING

I. CROSS-REFERENCE TO RELATED APPLICATIONS

The present application claims priority from Provisional Patent Application No. 63/515,648, filed Jul. 26, 2023, entitled "AUDIO PROCESSING," the content of which is incorporated herein by reference in its entirety.

II. FIELD

The present disclosure is generally related to audio processing, especially processing immersive audio.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One application of such devices includes providing immersive audio to a user. As an example, a headphone device worn by a user can receive streaming audio data from a remote server for playback to the user. Conventional multi-source spatial audio systems are often designed to use a relatively high complexity rendering of audio streams from multiple audio sources with the goal of ensuring that a worst-case performance of the headphone device still results in an acceptable quality of the immersive audio that is provided to the user. However, real-time local rendering of immersive audio is resource intensive (e.g., in terms of processor cycles, time, power, and memory utilization).

Another conventional approach is to offload local rendering of the immersive audio to the streaming device. For example, the headphone device can detect a rotation of the user's head and transmit head tracking information to a remote server. The remote server updates an audio scene based on the head tracking information, generates binaural audio data based on the updated audio scene, and transmits the binaural audio data to the headphone device for playback to the user.

Performing audio scene updates and binauralization at the remote server enables the user to experience an immersive audio experience via a headphone device that has relatively limited processing resources. However, due to latencies associated with transmitting the head tracking information to the remote server, updating the audio data based on the head rotation, and transmitting the updated binaural audio data to the headphone device, such a system can result in an unnaturally high motion-to-sound latency. In other words, the time delay between a rotation of the user's head and the corresponding modified spatial audio being played out at the user's ears can be unnaturally long, which may diminish the user's immersive audio experience.

Conventionally, immersive audio environments are generated based on rendering streaming audio data corresponding to one or more audio sources in the audio environment based on the listener's pose, and the listener's pose is based on pose data that is generated by one or more sensors of the listener's playback device. Inaccuracies in the pose data causes the listener's pose to be inaccurate. An audio playback system using an inaccurate listener's pose to initiate updates to the immersive audio environment can result in wasting of resources of the audio playback system, such as due to requesting, transmitting, and initiating rendering of an unneeded audio stream based on an inaccurate estimation of the listener's location.

IV. SUMMARY

According to one or more aspects of the present disclosure, a device includes a memory configured to store data associated with an immersive audio environment and one or more processors configured to obtain pose data for a listener in the immersive audio environment. The one or more processors are configured to determine a current listener pose based on the pose data and one or more pose constraints. The one or more processors are configured to obtain pose data based on the pose update parameter. The one or more processors are configured to obtain, based on the current listener pose, a rendered asset associated with the immersive audio environment. The one or more processors are configured to generate an output audio signal based on the rendered asset.

According to one or more aspects of the present disclosure, a method includes obtaining, at one or more processors, pose data for a listener in an immersive audio environment. The method includes determining, at the one or more processors, a current listener pose based on the pose data and one or more pose constraints. The method includes obtaining, at the one or more processors and based on the current listener pose, a rendered asset associated with the immersive audio environment. The method includes generating, at the one or more processors, an output audio signal based on the rendered asset.

According to one or more aspects of the present disclosure, a non-transitory computer-readable device stores instructions that are executable by one or more processors to cause the one or more processors to obtain pose data for a listener in an immersive audio environment. The instructions cause the one or more processors to determine a current listener pose based on the pose data and one or more pose constraints. The instructions cause the one or more processors to obtain, based on the current listener pose, a rendered asset associated with the immersive audio environment. The instructions cause the one or more processors to generate an output audio signal based on the rendered asset.

According to one or more aspects of the present disclosure, an apparatus includes means for obtaining pose data for a listener in an immersive audio environment. The apparatus includes means for determining a current listener pose based on the pose data and one or more pose constraints. The apparatus includes means for obtaining, based on the current listener pose, a rendered asset associated with the immersive audio environment. The apparatus includes means for generating an output audio signal based on the rendered asset.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
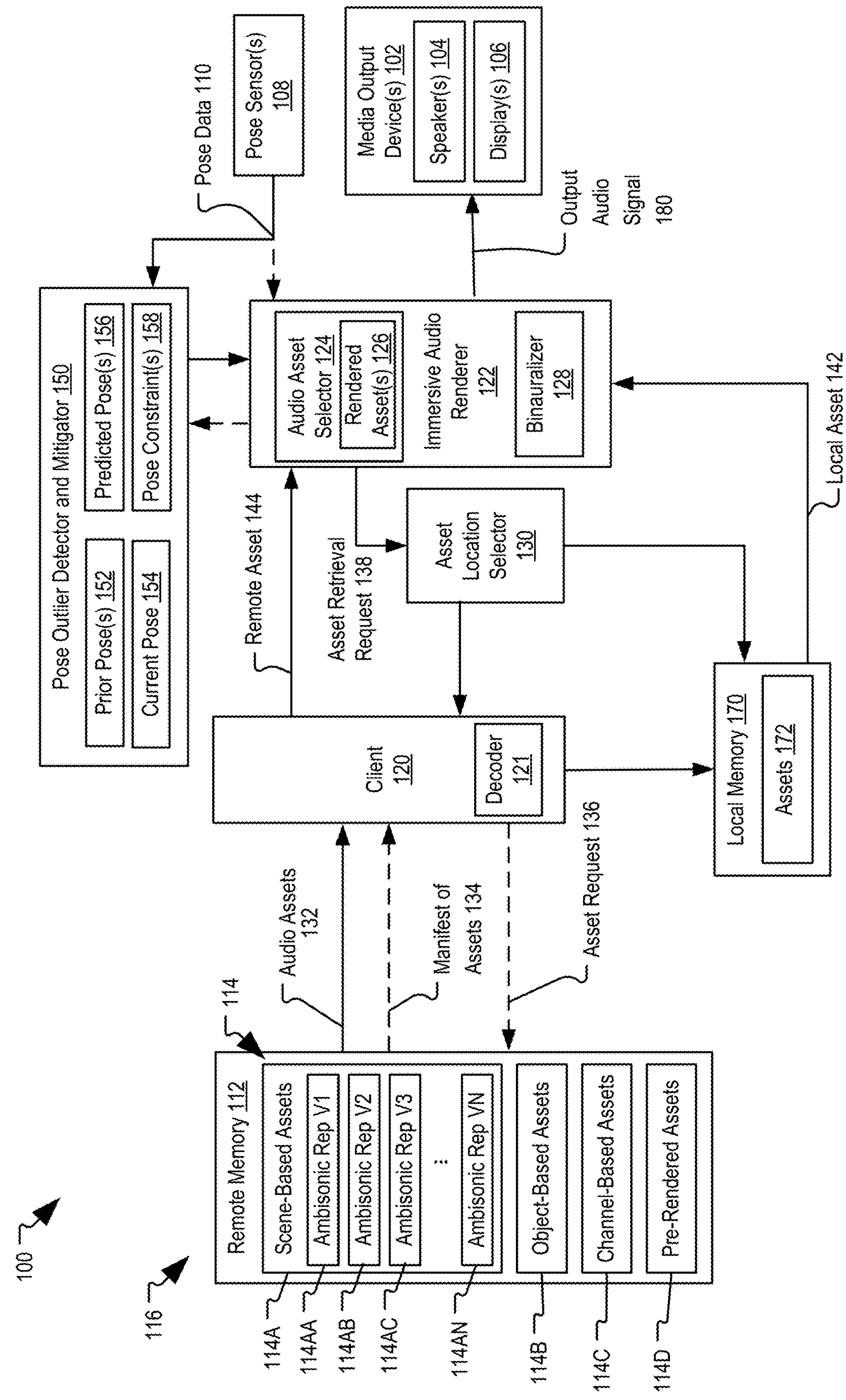
FIG. 1 is a block diagram of aspects of a system operable to process data associated with an immersive audio environment in accordance with some examples of the present disclosure.

Systems and methods for providing an immersive audio environment based on a listener's pose are described. Often, conventional immersive audio environments are generated based on rendering streaming audio data corresponding to one or more audio sources in the audio environment based on the listener's pose, and the listener's pose is based on pose data that is generated by one or more sensors of the listener's playback device. Inaccuracies in the pose data causes the listener's pose to be inaccurate. An audio playback system using an inaccurate listener's pose to initiate updates to an immersive audio environment can result in wasting of resources of the audio playback system, such as due to requesting, transmitting, and/or initiating rendering of an unneeded audio stream based on an inaccurate estimation of the listener's location.

The described systems and methods improve an accuracy of the immersive audio environment and improves efficiency by identifying and mitigating, based on one or more pose constraints, outlier values of the listener's pose. For example, one or more pose sensors may generate pose data of the listener that indicates a pose of the listener, and a determination is made as to whether the pose violates one or more constraints based on human body movement, or one or more spatial constraints, or a combination thereof. According to an aspect, the constraints based on human movement include one or more body pose constraints, such as a constraint on a pose of the listener's head relative to the listener's hand and/or torso, a velocity constraint, an acceleration constraint, or a combination thereof. The spatial constraints can include one or more spatial boundaries associated with the immersive audio environment, such as location limits corresponding to a 6 degrees-of-freedom (6 DOF) rendering operation.

When an outlier value of the listener's pose is detected that violates one or more of the human body movement constraints or spatial constraints, rather than use the outlier value, the disclosed techniques include determining a value for the listener's pose that does not violate any of the constraints. For example, the listener's pose may be set to the most recent (non-outlier) prior pose of the listener. As another example, the listener's pose may be determined by adjusting the outlier pose to not violate any of the constraints. Detection and mitigation of such pose outliers reduces the inefficiencies experienced by conventional systems as a result of processing inaccurate listener poses, including wasted resources due to requesting transmitting, and initiating rendering of an unneeded audio stream arising from an inaccurate estimation of the listener's location. In addition, detection and mitigation of such pose outliers improves the listener's experience by preventing audio rendering based on an estimate of the listener's movement that is likely erroneous and/or beyond a spatial boundary associated with the immersive audio environment.

According to some aspects, in addition to detecting and mitigating outlier of the listener's current pose, the disclosed techniques also include detecting and mitigating outlier values of a predicted listener pose. For example, a predicted listener pose can be determined based on the listener's current pose and used to pre-fetch assets, such as audio data associated with one or more audio sources, based on a predicted future location of the listener in the immersive audio environment. Detection and mitigation of outliers in predicted listener poses improves the efficiency of an audio rendering system by reducing mis-predictions associated with pre-fetching assets for rendering the immersive audio environment, such as by reducing the consumption of processing resources associated with fetching and processing assets based on incorrect predictions, reducing transmission bandwidth usage associated with pre-fetching of assets based on incorrect predictions, etc.

Figure 4:
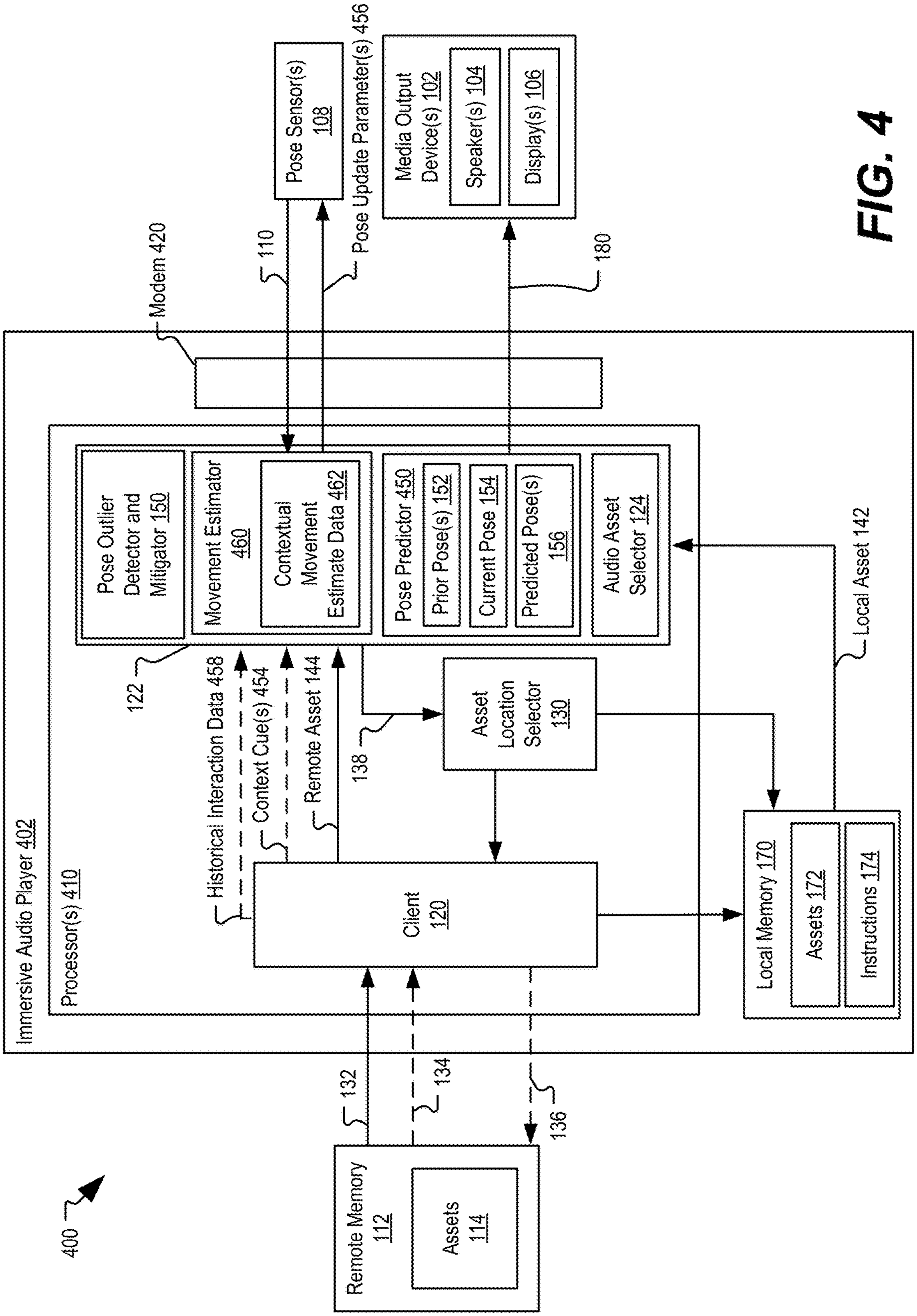
FIG. 4 is a block diagram of aspects of the system of FIG. 1 in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 4 depicts a system 400 including one or more processors ("processor(s)" 410 of FIG. 4), which indicates that in some implementations the system 400 includes a single processor 410 and in other implementations the system 400 includes multiple processors 410. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 7, multiple pose sensors are illustrated and associated with reference numbers 108A and 108B. When referring to a particular one of these pose sensors, such as a pose sensor 108A, the distinguishing letter "A" is used. However, when referring to any arbitrary one of these pose sensors or to these pose sensors as a group, the reference number 108 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, obtaining, selecting, reading, receiving, retrieving, or accessing the parameter (or signal) (e.g., from a memory, buffer, container, data structure, lookup table, transmission channel, etc.) that is already generated, such as by another component or device.

FIG. 1 is a block diagram of aspects of a system 100 operable to process data associated with an immersive audio environment in accordance with some examples of the present disclosure. The system 100 includes one or more media output devices 102 coupled to or including an immersive audio renderer 122. Each of the media output device(s) 102 is configured to output media content to a user. For example, each of the media output device(s) includes one or more speakers 104, one or more displays 106, or both. The media content can include sound (e.g., binaural or multichannel audio content) based on an output audio signal 180. Optionally, the media content can also include video content, game content, or other visual content.

The system 100 also includes one or more pose sensors 108. The pose sensor(s) 108 are configured to generate pose data 110 associated with a pose of a user of at least one of the media output device(s) 102. As used herein, a "pose" indicates a location and an orientation of the media output device(s) 102, a location and an orientation of the user of the media output device(s) 102, or both. In some implementations, at least one of the pose sensor(s) 108 is integrated within a wearable device, such that when the wearable device is worn by a user of a media output device 102, the pose data 110 indicates the pose of the user. In some such implementations, the wearable device can include the pose sensor 108 and at least one of the media output device(s) 102. To illustrate, the pose sensor 108 and at least one of the media output device(s) 102 can be combined in a head-mounted wearable device that includes the speaker(s) 104, the display(s) 106, or both. Examples of sensors that can be used as wearable pose sensors include, without limitation, inertial sensors (e.g., accelerometers or gyroscopes), compasses, positioning sensors (e.g., a global positioning system (GPS) receiver), magnetometers, inclinometers, optical sensors, one or more other sensors to detect acceleration, location, velocity, acceleration, angular orientation, angular velocity, angular acceleration, or any combination thereof. To illustrate, the pose sensor(s) 108 can include GPS, electronic maps, and electronic compasses that use inertial and magnetic sensor technology to determine direction, such as a 3-axis magnetometer to measure the Earth's geomagnetic field and a 3-axis accelerometer to provide, based on a direction of gravitational pull, a horizontality reference to the Earth's magnetic field vector.

In some implementations, at least one of the pose sensor(s) 108 is not configured to be worn by the user. For example, at least one of the pose sensor(s) 108 can include one or more optical sensors (e.g., cameras) to track movement of the user or the media output device(s) 102. In some implementations, the pose sensor(s) 108 can include a combination of sensor(s) worn by the user and sensor(s) that are not worn by the user, where the combination of sensors is configured to cooperate to generate the pose data 110.

The pose data 110 indicates the pose of the user or the media output device(s) 102 or indicates movement (e.g., changes in pose) of the user or the media output device(s) 102. In this context, "movement" includes rotation (e.g., a change in orientation without a change in location, such as a change in roll, tilt, or yaw), translation (e.g., non-rotational movement), or a combination thereof.

In FIG. 1, the immersive audio renderer 122 is configured to process immersive audio data to generate the output audio signal 180 based on the pose data 110. The immersive audio data corresponds to or is included within a plurality of immersive audio assets ("assets" in FIG. 1). In this context, an "asset" refers to a data structure (such as a file) that stores data representing at least a portion of an immersive audio environment. Generating the output audio signal 180 based on the pose data 110 includes generating a sound field representation of the immersive audio data in a manner that accounts for a current or predicted listener pose in the immersive audio environment. For example, the immersive audio renderer 122 is configured to perform a rendering operation on an asset (e.g., a remote asset 144, a local asset 142, or both) to generate a rendered asset 126. A rendered asset (whether pre-rendered or rendered as needed, e.g., in real-time) can include, for example, data describing sound from a plurality of sound sources of the immersive audio environment as such sound sources would be perceived by a listener at a particular position in the immersive audio environment or at the particular position and a particular orientation in the immersive audio environment. For example, for a particular listener pose, the rendered asset can include data representing sound field characteristics such as: an azimuth ($\theta$) and an elevation ($\varphi$) of a direction of an average intensity vector associated with a set of sources of the immersive audio environment; a signal energy (e) associated with the set of sources of the immersive audio environment; a direct-to-total energy ratio (r) associated with the set of sources of the immersive audio environment; and an interpolated audio signal ($\hat{s}$) for the set of sources of the immersive audio environment. In this example, each of these sound field characteristics can be calculated for each, frame (f), sub-frame (k), and frequency bin (b).

The immersive audio renderer 122 includes a binauralizer 128 that is configured to binauralize an output of the rendering operation (e.g., the rendered asset 126) to generate the output audio signal 180. According to an aspect, the output audio signal 180 includes an output binaural signal that is provided to the speaker(s) 104 for playout. The rendering operation and binauralization can include sound field rotation (e.g., three degrees of freedom (3 DOF)), rotation and limited translation (e.g., 3 DOF+), or rotation and translation (e.g., 6 DOF) based on the listener pose.

In FIG. 1, the immersive audio renderer 122 includes or is coupled to an audio asset selector 124 that is configured to select one or more assets based on the pose data 110. In some implementations, the audio asset selector 124 selects, based on a current listener pose indicated by the pose data 110, one or more assets for rendering to generate one of the rendered asset(s) 126. The "current listener pose" refers to the listener's position, the listener's orientation, or both, in the immersive audio environment as indicated by the pose data 110. In another example, the audio asset selector 124 can select, based on a current listener pose indicated by the pose data 110, one or more previously rendered assets 126 for output. To illustrate, the audio asset selector 124 selects one of the rendered assets 126 for binauralization and output via the output audio signal 180 based on the current listener pose indicated by the pose data 110.

In the same or different implementations, the audio asset selector 124 is configured to select one or more assets for rendering based on a predicted listener pose. As explained further below, a pose predictor can determine the predicted listener pose based on, among other things, the pose data 110. One benefit of selecting an asset based on a predicted listener pose is that the immersive audio renderer 122 can retrieve and/or process (e.g., render) the asset before the asset is needed, thereby avoiding delays due to asset retrieval and processing.

After selecting a target asset, the audio asset selector 124 generates an asset retrieval request 138. The asset retrieval request 138 identifies at least one target asset that is to be retrieved for processing by the immersive audio renderer 122. In implementations in which assets are stored in two or more locations, such as at a remote memory 112 and a local memory 170, the system 100 includes an asset location selector 130 configured to receive the target asset retrieval request 138 and determine which of the available memories to retrieve the asset from. In some circumstances, a particular asset may only be available from one of the memories. For example, assets 172 stored at the local memory 170 may include a subset of the assets 114 stored at the remote memory 112. To illustrate, as described further below, some of the assets 114 can be retrieved (e.g., pre-fetched) from the remote memory 112 and stored among the assets 172 at the local memory 170 before such assets are to be processed by the immersive audio renderer 122.

In some implementations, the asset location selector 130 is configured to retrieve a target asset from the local memory 170 if the target asset is among the assets 172 stored at the local memory 170. In such implementations, based on a determination that the target asset is not stored at the local memory 170, the asset location selector 130 selects to obtain the target asset from the remote memory 112. For example, the asset location selector 130 may send the asset retrieval request 138 to the client 120, and the client 120 may initiate retrieval of the target asset from the remote memory 112 via an asset request 136. Otherwise, based on a determination that the target asset is stored at the local memory 170, the asset location selector 130 selects to obtain the target asset from the local memory 170. For example, the asset location selector 130 may send the asset retrieval request 138 to the local memory 170 to initiate retrieval of the target asset to the immersive audio renderer 122 as a local asset 142.

In the example illustrated in FIG. 1, a remote device 116 includes the remote memory, which stores multiple assets 114 that correspond to representations of audio content associated with the immersive audio environment. For example, the assets 114 stored at the remote memory 112 can include one or more scene-based assets 114A, one or more object-based assets 114B, one or more channel-based assets 114C, one or more pre-rendered assets 114D, or a combination thereof. The remote memory 112 is configured to provide, to the client 120, a manifest of assets 134 that are available at the remote memory 112, such as a stream manifest. The remote memory 112 is configured to receive a request for one or more particular assets, such as the asset request 136 from the client 120, and to provide the target asset, such as an audio asset 132, to the client 120 in response to the request.

The pre-rendered assets 114D of FIG. 1 can include assets that have been subjected to rendering operations (e.g., as described further with reference to FIG. 6) to generate a sound field representation for a particular listener location or for particular listener location and orientation. The scene-based assets 114A of FIG. 1 can include various versions, such as a first ambisonics representation 114AA, a second ambisonics representation 114AB, a third ambisonics representation 114AC, and one or more additional ambisonics representations including an Nth ambisonics representation 114AN. One or more of the ambisonics representations 114AA-114AN can correspond to a full set of ambisonics coefficients corresponding to a particular ambisonics order, such as first order ambisonics, second order ambisonics, third order ambisonics, etc. Alternatively, or in addition, one or more of the ambisonics representations 114AA-114AN can correspond to a set of mixed order ambisonics coefficients that provides an enhanced resolution for particular listener orientations (e.g., for higher resolution in the listener's viewing direction as compared to away from the listener's viewing direction) while using less bandwidth than a full set of ambisonics coefficients corresponding to the enhanced resolution.

In some implementations, the assets 172 can include the same types of assets as the assets 114. For example, the assets 172 can include scene-based assets, object-based assets, channel-based assets, pre-rendered assets, or a combination thereof. For example, as noted above, in some implementations, one or more of the assets 114 can be retrieved from the remote memory 112 and stored among the assets 172 at the local memory 170 before such assets are to be processed by the immersive audio renderer 122. When the remote memory 112 provides an asset to the client 120, the asset can be encoded and/or compressed for transmission (e.g., over one or more networks). In some implementations, the client 120 includes or is coupled to a decoder 121 that is configured to decode and/or decompress the asset for storage at the local memory 170, for communication to the immersive audio renderer 122 as a remote asset 144, or both. In some such implementations, one or more of the assets 172 are stored at the local memory 170 in an encoded and/or compressed format, and decoder 121 is operable to decode and/or decompress the a selected one of the asset(s) 172 before the selected asset is communicated to the immersive audio renderer 122 as a local asset 142. To illustrate, when the target asset identified in the asset retrieval request 138 is among the assets 172 stored at the local memory 170, the asset location selector 130 can determine whether the asset is stored in an encoded and/or compressed format. The asset location selector 130 can selectively cause the decoder 121 to decode and/or decompress the asset based on the determination.

In FIG. 1, the system 100 includes a pose outlier detector and mitigator 150 configured to determine a current listener pose based on the pose data 110 and one or more pose constraints 158. For example, the pose data 110 may indicate a current pose 154 for a listener in the immersive audio environment, and the pose outlier detector and mitigator 150 determines whether to adjust a value of the current pose 154 based on whether the current pose 154 violates one or more of the pose constraint(s) 158. Additionally or alternatively, the pose outlier detector and mitigator 150 is configured to determine whether to adjust a value of one or more predicted poses 156 based on the current listener pose and the pose constraint(s) 158.

For example, as described in further detail with reference to FIG. 2, the pose outlier detector and mitigator 150 is configured to obtain a pose based on the pose data 110 and determine whether the pose violates at least one of the pose constraint(s) 158. Based on a determination that the pose does not violate the pose constraint(s) 158, the pose outlier detector and mitigator 150 is configured to use the pose as the current listener pose 154.

According to some aspects, the pose constraint(s) 158 include a human body movement constraint. For example, the human body movement constraint can correspond to a velocity constraint or an acceleration constraint, and the pose outlier detector and mitigator 150 can determine a velocity and/or acceleration of the listener based on the listener's current pose indicated by the pose data 110 and based on one or more prior poses 152 of the listener. The pose outlier detector and mitigator 150 can determine whether the human body movement constraint is violated based on comparing the determined velocity to the velocity constraint and/or by comparing the determined acceleration to the acceleration constraint. In another example, the human body movement constraint corresponds to a constraint on a hand or torso pose of the listener relative to a head pose of the listener, and the outlier detector and mitigator 150 can determine whether the human body movement constraint is violated based on determining a relationship (e.g., a rotational offset, a location difference, etc.) between the listener's head and the listener's hand and/or the listener's torso, and comparing the determined head/body relationship to the constraint.

According to some aspects, the pose constraint(s) 158 include a boundary constraint that indicates a boundary associated with the immersive audio environment. The pose outlier detector and mitigator 150 can compare a location of the listener indicated by the pose data 110 to the boundary to determine if the boundary constraint is violated.

If the pose outlier detector and mitigator 150 determines that one or more of the pose constraint(s) 158 are violated, the pose outlier detector and mitigator 150 can generate or update a value of the current listener pose such that the current listener pose satisfies the pose constraint(s) 158. For example, a most recent prior pose 152 that did not violate any of the pose constraint(s) 158 can be used as the current pose 154, as described further with reference to FIG. 3A. As another example, the pose indicated by the pose data 110 can be adjusted based on the pose constraint(s) 158 to obtain a current pose 154 that does not violate any of the pose constraint(s) 158, as described further with reference to FIG. 3B.

Similarly, the pose outlier detector and mitigator 150 can obtain a predicted pose 156 that corresponds to a predicted listener pose from a pose predictor, such as described further with reference to FIG. 4. The pose outlier detector and mitigator 150 can determine an acceleration and/or velocity associated with a predicted movement of the listener from the current pose 154 to the predicted pose 156 to determine whether a human body movement constraint of the pose constraint(s) 158 would be violated by the predicted movement of the listener to the predicted pose 156. The pose outlier detector and mitigator 150 can also determine whether the predicted pose 156 violates a constraint on a hand or torso pose of the listener relative to a head pose of the listener, a boundary constraint, or one or more other of the pose constraint(s) 158. If the predicted pose 156 is determined to violate any of the pose constraint(s) 158, the pose outlier detector and mitigator 150 can generate or update a value of the predicted pose 156 such that the generated or updated value of the predicted pose 156 satisfies the pose constraint(s) 158.

A technical advantage of detecting and mitigating listener pose outliers is that audio rendering based on a listener's movement that is likely erroneous and/or beyond a spatial boundary associated with the immersive audio environment can be reduced or eliminated, which can conserve processing resources of the system 100 as well as improve the listener's experience. Similarly, in addition to detecting and mitigating outlier values of the listener's current pose, detection and mitigation of outliers in predicted listener poses improves the efficiency of the system 100 by reducing mis-predictions associated with pre-fetching assets for rendering the immersive audio environment, such as by reducing the consumption of processing resources associated with fetching and processing assets based on incorrect predictions, reducing usage of bandwidth associated with pre-fetching of assets based on incorrect predictions, etc.

The technical advantages described above can be attained even when the pose sensor(s) 108 perform filtering of pose sensor data to remove outliers during generation of the pose data 110. For example, one or more of the pose sensor(s) 108 may implement filtering (e.g., Kalman filtering) to remove outliers in the pose sensor data and/or in the pose data 110 itself. However, such filtering is conventionally performed without access to the specific pose constraint(s) 158 associated with rendering of the audio scene at the system 100, such as human body movement constraints and audio scene boundaries. Thus, the pose data 110 can still include listener poses that are determined to be outliers by the pose outlier detector and mitigator 150.

Although FIG. 1 illustrates both the local memory 170 storing assets 172 and the remote memory 112 storing assets 114, in other implementations, only one or the other of the memories 112, 170 stores assets for playout. For example, in some implementations or in some modes of operation of the system 100, the assets 172 are downloaded to the local memory 170 for use, and the asset location selector 130 always retrieves assets 172 from the local memory 170. To illustrate, the system 100 can operate in a local-only mode when a network connection to the remote memory 112 is not available (e.g., when a device is in "airplane mode"). As another example, in some implementations or in some modes of operation of the system 100, the assets 114 are downloaded from the remote memory 112 for use, and the asset location selector 130 always retrieves assets 114 from the remote memory 112 via the client 120. To illustrate, the system 100 can operate in a remote-only mode when streaming content from a streaming service associated with the remote memory 112. In some implementations, the system 100 can be configured for remote-only operation, and the local memory 170, the asset location selector 130, or both can be omitted.

FIG. 1 illustrates one particular, non-limiting, arrangement of the components of the system 100. In other implementations, the components can be arranged and interconnected in a different manner than illustrated in FIG. 1. For example, the decoder 121 can be distinct from and external to the client 120. As another example, the audio asset selector 124 can be distinct from and external to the immersive audio renderer 122. To illustrate, the audio asset selector 124 and the asset location selector 130 can be combined. As another example, the pose outlier detector and mitigator 150 can be combined with the audio asset selector 124.

In some implementations, many of the components of the system 100 are integrated within the media output device(s) 102. For example, the media output device(s) 102 can include a head-mounted wearable device, such as a headset, a helmet, earbuds, etc., that include the client 120, the local memory 170, the asset location selector 130, the immersive audio renderer 122, the movement estimator 460, the pose sensor(s) 108, or any combination thereof. As another example, the media output device(s) 102 can include a head-mounted wearable device and a separate player device, such as a game console, a computer, or a smart phone. In this example, at least one pair of the speaker(s) 104 and at least one of the pose sensor(s) 108 can be integrated within the head-mounted wearable device and other components of the system 100 can be integrated into the player device, or divided between the player device and the head-mounted wearable device.

Figure 2:
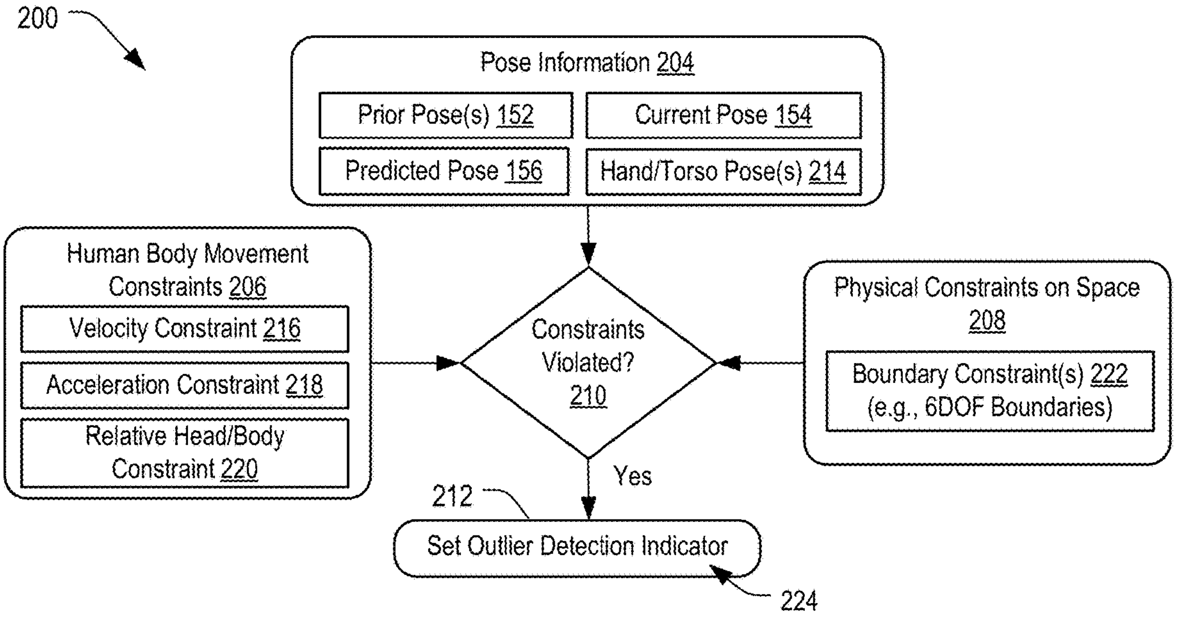
FIG. 2 is a diagram of operations that may be performed by the system of FIG. 1 in accordance with some examples of the present disclosure.

FIG. 2 depicts an example of pose outlier detection operations 200 that may be performed by the pose outlier detector and mitigator 150. The operations 200 include determining whether one or more pose constraints are violated, at block 210.

For example, the pose outlier detector and mitigator 150 processes pose information 204 that includes the prior pose(s) 152, the current pose 154, the predicted pose(s) 156, and one or more hand/torso poses 214. To illustrate, one or more of the pose sensor(s) 108 may be configured to track movement of the listener's hand, such as pose sensor(s) 108 included in (or coupled to) a handheld controller device, a virtual reality and/or haptic glove, a smart watch or other hand-based wearable device, etc. Additionally or alternatively, one or more of the pose sensor(s) 108 may be configured to track movement of the listener's torso, such as pose sensor(s) 108 included in (or coupled to) a portable electronic device such as a smart phone or tablet device, a virtual reality and/or haptic vest, etc.

The determination of whether one or more pose constraints are violated, at block 210, is based on human body movement constraints 206 and physical constraints on space 208. For example, the human body movement constraints 206 can be included in the pose constraints 158 and can include a velocity constraint 216, an acceleration constraint 218, and a constraint on a hand or torso pose of the listener relative to a head pose of the listener, illustrated as a relative head/body constraint 220.

The physical constraints on space 208 include one or more boundary constraints 222, such as 6 DOF boundaries associated with rendering of the immersive audio environment. For example, the physical constraints on space 208 can include scene boundary distances along 6 directions, such as boundary distances in a +x direction, a −x direction, a +y direction, a −y direction, a +z direction, and a −z direction, where (x, y, z) correspond to a coordinate system used by the immersive audio renderer 122 to represent locations of the listener and audio sources associated with the sound scene.

Determining whether the one or more constraints are violated, at block 210, can include determining a velocity associated with the current pose 154 and comparing the velocity to the velocity constraint 216. For example, the velocity can correspond to a rotational velocity associated with a difference in the listener's head orientation between a selected prior pose 152 (e.g., a most recent prior pose 152) and the current pose 154 over a time period between a first timestamp associated with the selected prior pose 152 and a second timestamp associated with the current pose 154. The velocity constraint 216 can include a rotational velocity threshold, and the determined rotational velocity can be compared to the rotational velocity threshold to determine if the velocity constraint 216 is violated. As another example, the velocity can correspond to a translational velocity associated with a difference in the listener's location between a selected prior pose 152 (e.g., a most recent prior pose 152) and the current pose 154 over a time period between a first timestamp associated with the selected prior pose 152 and a second timestamp associated with the current pose 154. The velocity constraint 216 can include a translational velocity threshold, and the determined translational velocity can be compared to the translational velocity threshold to determine if the velocity constraint 216 is violated. Similar comparisons can be made to determine if the predicted pose 156 violates a rotational and/or translational velocity threshold of the velocity constraint 216 by determining the rotational velocity based on the change of head orientation between the current pose 154 and the predicted pose 156 over the time period between the second timestamp associated with the current pose 154 and a predicted third timestamp associated with the predicted pose 156 and/or by determining the translational velocity based on the change of the listener's location between the current pose 154 and the predicted pose 156 over the time period between the second timestamp associated with the current pose 154 and the predicted third timestamp associated with the predicted pose 156.

Determining whether the one or more constraints are violated, at block 210, can include determining an acceleration associated with the current pose 154 and comparing the acceleration to the acceleration constraint 218. For example, the acceleration can correspond to a rotational acceleration associated with a difference in the listener's head rotational velocity between a selected prior pose 152 (e.g., a most recent prior pose 152) and the current pose 154 over a time period between a first timestamp associated with the selected prior pose 152 and a second timestamp associated with the current pose 154. The acceleration constraint 218 can include a rotational acceleration threshold, and the determined rotational acceleration can be compared to the rotational acceleration threshold to determine if the acceleration constraint 218 is violated. As another example, the acceleration can correspond to a translational acceleration associated with a difference in the listener's translational velocity between a selected prior pose 152 (e.g., a most recent prior pose 152) and the current pose 154 over a time period between a first timestamp associated with the selected prior pose 152 and a second timestamp associated with the current pose 154. The acceleration constraint 218 can include a translational acceleration threshold, and the determined translational acceleration can be compared to the translational acceleration threshold to determine if the acceleration constraint 218 is violated. Similar comparisons can be made to determine if the predicted pose 156 violates a rotational and/or translational acceleration threshold of the acceleration constraint 218 by determining the rotational acceleration based on the change of head rotational velocity between the current pose 154 and the predicted pose 156 over the time period between the second timestamp associated with the current pose 154 and a predicted third timestamp associated with the predicted pose 156 and/or by determining the translational acceleration based on the change of the listener's translational velocity between the current pose 154 and the predicted pose 156 over the time period between the second timestamp associated with the current pose 154 and the predicted third timestamp associated with the predicted pose 156.

Determining whether the one or more constraints are violated, at block 210, can include determining the listener's current hand and/or torso location relative to the listener's head pose indicated by the current pose 154, and comparing the current hand and/or torso location relative to the listener's head pose to the relative head/body constraint 220. For example, the hand/torso pose 214 may include a hand pose that indicates a location of the listener's hand, and the location of the listener's hand relative to the location of the listener's head (indicated by the current pose 154) may be determined and compared to a hand-to-head relative location constraint of the relative head/body constraint 220. As another example, the hand/torso pose 214 may include a body pose that indicates a location of the listener's torso, and the location of the listener's torso relative to the location of the listener's may be determined and compared to a torso-to-head relative location constraint of the relative head/body constraint 220. Similar operations may be performed to compare a hand-to-head relative rotation and/or a torso-to-head relative rotation to a hand-to-head relative rotation constraint and/or a torso-to-head relative rotation constraint, respectively, of the relative head/body constraint 220. In some implementations, analogous comparisons of predicted hand-to-head relative location and/or rotation, predicted torso-to-head relative location and/or rotation, or a combination thereof, may be made to corresponding constraints of the relative head/body constraint 220 to determine if the predicted pose 156 and a predicted head/torso pose violate the relative head/body constraint 220.

Determining whether the one or more constraints are violated, at block 210, can include determining the listener's location in the audio scene, as indicated by the current pose 154, and comparing the listener's location to physical constraints on space 208. For example, the listener's location can be compared to the boundary constraints 222 to determine whether the listener is within or outside of a spatial boundary defined by the boundary constraints 222. Determining whether the one or more constraints are violated, at block 210, can include determining a predicted listener location in the audio scene, as indicated by the predicted pose 156, and comparing the listener's predicted location to the physical constraints on space 208. For example, the listener's predicted location can be compared to the boundary constraints 222 to determine whether the listener is predicted to be within or outside of a spatial boundary defined by the boundary constraints 222.

In response to determining, based on the pose information 204, that one or more of the human body movement constraints 206 and/or one or more of the physical constraints on space 208 are violated, the pose outlier detector and mitigator 150 sets an outlier detection indicator 224, at block 212. The outlier detection indicator 224 may be used to trigger performance of pose outlier mitigation operations, as described further with reference to FIGS. 3A-B.

In some implementations, the outlier detection indicator 224 includes an indication of which constraint(s) were violated, an indication of whether the violations were detected for the current pose 154, for the predicted pose 156, or any combination thereof. Information associated with the determining that one or more constraints have been violated, such as computed velocities, accelerations, locations, relative movements, etc., can also be saved for re-use during outlier mitigation.

Figure 3A:
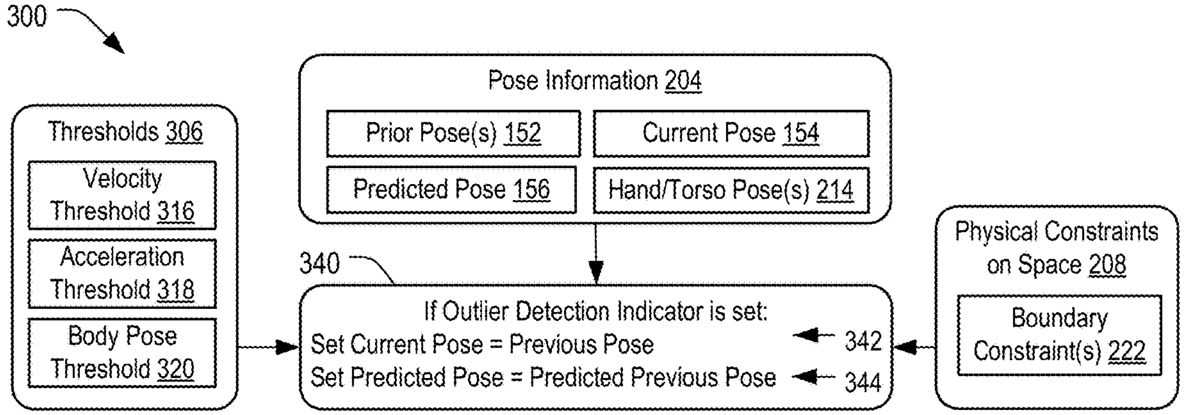
FIG. 3A is a diagram of operations that may be performed by the system of FIG. 1 in accordance with some examples of the present disclosure.

FIG. 3A depicts a first example of pose outlier mitigation operations 300 that may be performed by the pose outlier detector and mitigator 150. The operations 200 include determining whether one or more pose constraints are violated, such as by determining, at block 340, whether the outlier detection indicator 224 has been set.

Based on a determination that the current pose 154 does not violate the one or more pose constraints (e.g., the outlier detection indicator 224 has not been set), the pose outlier detector and mitigator 150 is configured to use the current pose 154 as the current listener pose for purposes of asset retrieval (e.g., stream selection) at the audio asset selector 124 and/or rendering at the immersive audio renderer 122.

Otherwise, based on a determination that the current pose 154 violates at least one of the one or more pose constraints, the pose outlier detector and mitigator 150 is configured to determine the current listener pose based on a prior listener pose that did not violate the pose constraints. To illustrate, if the outlier detection indicator 224 has been set to indicate that the current pose 154 is an outlier, the current pose 154 is set to a previous pose, at operation 342. For example, the current pose 154 can be set to have the value of a most recent prior pose 152 that was not determined to be an outlier. Setting the current pose 154 to the value of the most recent non-outlier prior pose 152 can include changing one or more values of the current pose 154 to equal corresponding values of the prior pose 152, replacing the current pose 154 with the prior pose 152, or adjusting the current pose 154 to match the prior pose 152, as illustrative, non-limiting examples.

In some implementations, the pose outlier detector and mitigator 150 is further configured to, based on the determination that the current pose 154 violates at least one of the one or more pose constraints, determine the predicted pose 156 based on a prior predicted listener pose associated with the prior listener pose. For example, the prior pose 152 that is selected as the most recent non-outlier prior pose 152 for adjusting the current pose 154 may be associated with a prior predicted listener pose, and the predicted pose 156 is set to the value of that prior predicted listener pose, at operation 344.

One effect of the operations 342, 344 at block 340 is that the pose(s) used for asset selection and audio rendering may effectively repeat the most recent prior non-outlier pose and predicted pose, as if the listener had not moved since the prior non-outlier pose was indicated in the pose data 110. In certain circumstances, when one or more of the human body movement constraints 206 were detected to be violated, the violation may be indicative of an unusually large or physiologically improbable (or impossible) movement of the listener. For example, the human body movement constraints 206 may be associated with respective thresholds 306, including a velocity threshold 316 corresponding to the velocity constraint 216, an acceleration threshold 318 corresponding to the acceleration constraint 218, and a body pose threshold 320 corresponding to the body pose threshold 320. Each of the thresholds 306 may correspond to a maximum limit above which the listener's motion would prevent the listener from being able to track changes in the audio scene, so processing resources that would otherwise be expended by selecting, acquiring, and rendering assets while the listener's motion is greater than one or more of the thresholds 306 can be conserved without adversely impacting the listener's experience. In other circumstances, when one or more of the physical constraints on space 208 were detected to be violated, the violation may be indicative of the listener moving outside of the audio scene boundaries or into a region of the audio scene that has no audio sources, and repeating the most recent prior non-outlier pose and predicted pose prevents generation of an ineffectual target asset retrieval request 138.

Figure 3B:
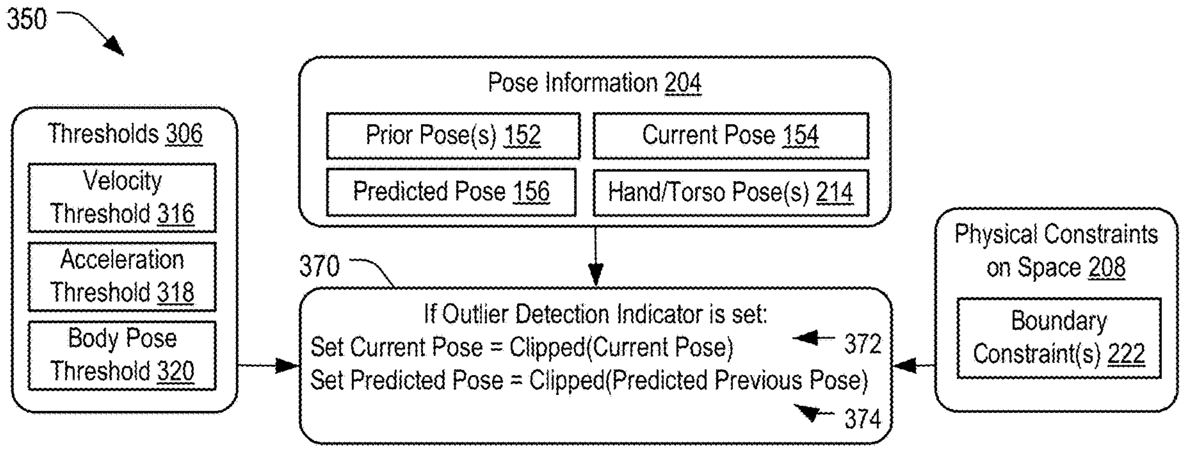
FIG. 3B is a diagram of operations that may be performed by the system of FIG. 1 in accordance with some examples of the present disclosure.

FIG. 3B depicts a second example of pose outlier mitigation operations 350 that may be performed by the pose outlier detector and mitigator 150. The operations 200 include determining whether one or more pose constraints are violated, such as by determining, at block 370, whether the outlier detection indicator 224 has been set.

Based on a determination that the current pose 154 does not violate the one or more pose constraints (e.g., the outlier detection indicator 224 has not been set), the pose outlier detector and mitigator 150 is configured to use the current pose 154 as the current listener pose for purposes of asset retrieval (e.g., stream selection) at the audio asset selector 124 and/or rendering at the immersive audio renderer 122.

Otherwise, based on a determination that the current pose 154 violates at least one of the one or more pose constraints, the pose outlier detector and mitigator 150 is configured to determine the current listener pose based on an adjustment of the current pose 154 to satisfy the one or more pose constraints. To illustrate, if the outlier detection indicator 224 has been set to indicate that the current pose 154 is an outlier, a value of the current pose 154 is adjusted to match a threshold 306 or a spatial boundary associated with a violated pose constraint at operation 372. For example, when a velocity of the listener that is determined based on the current pose 154 exceeds the velocity threshold 316, the velocity associated with the current pose 154 may be adjusted to match the velocity threshold 316, such as via a clipping operation that clips one or more values associated with the current pose such that none of the thresholds 306 are exceeded, at operation 372. As another example, when a location of the listener based on the current pose 154 is outside of a boundary indicated by the velocity constraint 216, the location associated with the current pose 154 may be clipped so that the boundary is not crossed (e.g., movement of the listener is allowed up to, but not beyond, the boundary).

In some implementations, the pose outlier detector and mitigator 150 is further configured to, based on the determination that the current pose 154 violates at least one of the one or more pose constraints, determine the predicted pose 156 based on adjusting a prior predicted listener pose associated with a prior listener pose. For example, a most recent non-outlier prior pose 152 may be selected, and the prior predicted pose 156 associated with the selected prior pose 152 may instead be used as the predicted pose 156. If use of the selected prior predicted pose 156 causes one or more of the thresholds 306 or the spatial boundaries to be exceeded, the prior predicted pose 156 can be adjusted (e.g., clipped) to match a threshold or a boundary associated with a violated pose constraint, at operation 374, in a similar manner as described for operation 372.

One effect of the operations 372, 374 at block 370 is that the pose(s) used for asset selection and audio rendering may track the listener's pose that is indicated by the pose data 110 as closely as possible but without allowing the listener's pose to violate any of the thresholds 306 or boundary constraints 222.

Although a particular implementation of each of the operations 200, 300, and 350 of FIGS. 2, 3A, and 3B, respectively, has been described, in alternative implementations, the operations 200, 300, and 350 of FIGS. 2, 3A, and 3B, respectively, can omit one or more of the human body movement constraints 206 and the associated threshold(s) 306, incorporate one or more additional human body movement constraints 206 and associated threshold(s) 306, or a combination thereof. In some implementations, the human body movement constraints 206 and the associated threshold (s) 306 can be omitted, and outlier detection and mitigation can be performed based solely on the physical constraints on space 208. Similarly, the operations 200, 300, and 350 of FIGS. 2, 3A, and 3B, respectively, can omit one or more of the physical constraints on space 208 and the associated boundary constraints 222, incorporate one or more physical constraint on space 208 and associated spatial conditions, or a combination thereof. In some implementations, the physical constraints on space 208 can be omitted, and the outlier detection and mitigation can be performed based solely on the human body movement constraints 206.

FIG. 4 is a block diagram of a system 400 that includes aspects of the system 100 of FIG. 1. For example, the system 400 includes the media output device(s) 102, the immersive audio renderer 122, the asset location selector 130, the client 120, the local memory 170, and the remote memory 112 of FIG. 1, each of which operates as described with reference to FIG. 1. In the system 400, the immersive audio renderer 122, the asset location selector 130, the client 120, and the local memory 170 are included in an immersive audio player 402 that is configured to communicate (e.g., via a modem 420) with the pose sensor(s) 108 and the media output device(s) 102. In other examples, the media output device(s) 102 and the immersive audio player 402 are integrated within a single device, such as a wearable device, which can include the speaker(s) 104, the display(s) 106, the pose sensor(s) 108, or a combination thereof.

In FIG. 4, the immersive audio player 402 includes one or more processors 410 configured to execute instructions (e.g., instructions 174 from the local memory 170) to perform the operations of the immersive audio renderer 122, the asset location selector 130, the client 120, the pose outlier detector and mitigator 150, the audio asset selector 124, a movement estimator 460, a pose predictor 450, or a combination thereof.

FIG. 4 illustrates an example of the system 100 of FIG. 1 in which the pose outlier detector and mitigator 150 is an aspect of the immersive audio renderer 122. For example, the pose outlier detector and mitigator 150 can be integrated within or coupled to the pose predictor 450. The pose outlier detector and mitigator 150 may be configured to process current listener poses (e.g., the current pose 154) indicated by the pose data 110 and predicted listener poses (e.g., the predicted pose 156) generated by the pose predictor 450 to detect and mitigate pose outliers, prior to the current listener poses and/or the predicted listener poses being used by the audio asset selector 124, the movement estimator 460, the pose predictor 450, the immersive audio renderer 122, or any combination thereof. In some implementations, the pose outlier detector and mitigator 150 may also be configured to process contextual movement estimate data 462, which indicates how much movement or a type of movement in a listener's pose that is expected at a particular time, in a similar manner as described above for detecting and mitigating outliers in predicted listener poses.

In some implementations, the movement estimator 460 is configured to determine the contextual movement estimate data 462 based on the prior pose(s) 152, the current pose 154, the predicted pose(s) 156, or a combination thereof. For example, the movement estimator 460 can determine the contextual movement estimate data 462 based on a historical movement rate, where the historical movement rate is determined based on differences between the prior pose(s) 152, between the prior pose(s) 152 and the current pose 154, between the prior pose(s) 152 or current pose 154 and the predicted pose(s) 156, or combinations thereof. In this context, the prior pose(s) 152 can include historical pose data 110; whereas the current pose 154 refers to a pose indicated by a most recent set of samples of the pose data 110.

The movement estimator 460 can base the contextual movement estimate data 462 on various types of information. For example, the movement estimator 460 can generate the movement estimate data 462 based on the pose data 110. To illustrate, the pose data 110 can indicate a current listener pose, and the movement estimator 460 can generate the movement estimate data 462 based on the current listener pose or a recent set of changes in the current listener pose over time. As one example, the movement estimator 460 can generate the contextual movement estimate data 462 based on a recent rate and/or a recent type of change of the listener pose, based on a set of recent listener pose data, where "recent" is determined based on some specified time limit (e.g., the last one minute, the last five minutes, etc.) or based on a specified number of samples of the pose data 110 (e.g., the most recent ten samples, the most recent one hundred samples, etc.).

As another example, the movement estimator 460 can generate the movement estimate data 462 based on a predicted pose. For example, a pose predictor can generate a predicted listener pose based at least partially on the pose data 110. The predicted listener pose can indicate a location and/or orientation of the listener in the immersive audio environment at some future time. In this example, the movement estimator 460 can generate the movement estimate data 462 based on movement that will occur (e.g., that is predicted to occur) to change from the current listener pose to the predicted listener pose.

As another example, the movement estimator 460 can generate the movement estimate data 462 based on historical interaction data 458 associated with an asset, associated with an immersive audio environment, associated with a scene of the immersive audio environment, or a combination thereof. The historical interaction data 458 can be indicative of interaction of a current user of the media output device(s) 102, interaction of other users who have consumed specific assets or interacted with the immersive audio environment, or a combination thereof. For example, the historical interaction data 458 can include movement trace data descriptive of movements of a set of users (which may include the current user) who have interacted with the immersive audio environment. In this example, the movement estimator 460 can use the historical interaction data 458 to estimate how much the current user is likely to move in the near future (e.g., during consumption of a portion of an asset or scene that the user is currently consuming). To illustrate, when the immersive audio environment is related to game content, a scene of the game content can depict (in sound, video, or both) a startling event (e.g., an explosion, a crash, a jump scare, etc.) that historically has caused users to quickly look in a particular direction or to pan around the environment, as indicated by the historical interaction data 458. In this illustrative example, the contextual movement estimate data 462 can indicate, based on the historical interaction data 458, that a rate of movement and/or a type of movement of the listener pose is likely to increase when the startling event occurs.

As another example, the movement estimator 460 can generate the movement estimate data 162 based on one or more context cues 454 (also referred to herein as "movement cues") associated with the immersive audio environment. One or more of the context cue(s) 454 can be explicitly provided in metadata of the asset(s) representing the immersive audio environment. For example, metadata associated with an asset can include a field that indicates the contextual movement estimate data 462. To illustrate, a game creator or distributor can indicate in metadata associated with a particular asset that the asset or a portion of the asset is expected to result in a change in the rate of listener movement. As one example, if a scene of a game includes an event that is likely to cause the user to move more (or less), metadata of the game can indicate when the event occurs during playout of an asset, where the event occurs (e.g., a sound source location in the immersive audio environment), a type of event, an expected result of the event (e.g., increased or decreased translation in a particular direction, increased or decreased head rotation, etc.), a duration of the event, etc.

In some implementations, one or more of the context cue(s) 454 are implicit rather than explicit. For example, metadata associated with an asset can indicate a genre of the asset, and the movement estimator 460 can generate the contextual movement estimate data 462 based on the genre of the asset. To illustrate, the movement estimator 460 may expect less rapid head movement during play out of an immersive audio environment representing a classical music genre than is expected during play out of an immersive audio environment representing a first-person shooter game.

The movement estimator 460 is configured to set one or more pose update parameter(s) 456 based on the contextual movement estimate data 462. In a particular aspect, the pose update parameter(s) 456 indicate a pose data update rate for the pose data 110. For example, the movement estimator 460 can set the pose update parameter(s) 456 by sending the pose update parameter(s) 456 to the pose sensor(s) 108 to cause the pose sensor(s) 108 to provide the pose data 110 at a rate associated with the pose update parameter(s) 456. In some implementations, the system 100 includes two or more pose sensor(s) 108. In such implementations, the movement estimator 460 can send the same pose update parameter(s) 456 to each of the two or more pose sensor(s) 108, or the movement estimator 460 can send the different pose update parameter(s) 456 to different pose sensor(s) 108. To illustrate, the system 100 can include a first pose sensor 108 configured to generate pose data 110 indicating a translational position of a listener in the immersive audio environment and a second pose sensor 108 configured to generate pose data 110 indicating a rotational orientation of the listener in the immersive audio environment. In this example, the movement estimator 460 can send the different pose update parameter(s) 456 to the first and second pose sensors 108. For example, the contextual movement estimate data 462 can indicate that a rate of head rotation is expected to increase whereas a rate of translation is expected to remain unchanged. In this example, the movement estimator 460 can send first pose update parameter(s) 456 to cause the second pose sensor to increase the rate of generation of the pose data 110 indicating the rotational orientation of the listener and can refrain from sending pose update parameter(s) 456 to the first pose sensor (or can send second pose update parameter(s) 456) to cause the first pose sensor to continue generation of the pose data 110 indicating the translational orientation at the same rate as before.

One technical advantage of using the contextual movement estimate data 462 to set the pose update parameter(s) 456 is that pose data 110 update rates can be set based on user movement rates, which can enable conservation of resources and improved user experience. For example, when relatively high movement rates are expected (as indicated by the contextual movement estimate data 462), the pose update parameter(s) 456 can be set to increase the rate at which the pose data 110 is updated. The increased update rate for the pose data 110 reduces motion/sound latency of the output audio signal 180. To illustrate, in this example, user movement (e.g., head rotation) is reflected in the output audio signal 180 more quickly because pose data 110 reflecting the user movement is available to the immersive audio renderer 122 more quickly. Conversely, when relatively low movement rates are expected (as indicated by the contextual movement estimate data 462) the pose update parameter(s) 456 can be set to decrease the rate at which the pose data 110 is updated. The decreased update rate for the pose data 110 conserves resources (e.g., computing cycles, power, memory) associated with rendering and binauralization by the immersive audio renderer 122, resources (e.g., bandwidth, power) associated with transmission of the pose data 110, or a combination thereof.

In a particular aspect, the pose predictor 450 is configured to determine the predicted pose(s) 156 using predictive techniques such as extrapolation based on the prior pose(s) 152 and/or the current pose 154; inference using one or more artificial intelligence models; probability-based estimates based on the prior pose(s) 152 and/or the current pose 154; probability-based estimates based on the historical interaction data 458 of FIG. 1; the context cues 454 of FIG. 1; or combinations thereof. The predicted pose(s) 156 can be used to reduce motion-to-sound latency of the output audio signal 180. For example, the immersive audio renderer 122 can generate asset retrieval requests 138 for one or more assets associated with the predicted pose(s) 156. In this example, the immersive audio renderer 122 can process an asset associated with a particular predicted pose 156 to generate a rendered asset. The rendered asset represents a sound field of the immersive audio environment as the sound field would be perceived by a listener having the particular predicted pose 156. In this example, the rendered asset is used to generate the output audio signal 180 when (or if) the pose data 110 indicates that the particular predicted pose 156 used to render the asset is the current pose 154. By using the predicted pose(s) 156 to select and/or render assets, the immersive audio renderer 122 is able to perform many complex rendering operations in advance, leading to reduced latency of providing the output audio signal 180 representing a particular asset and pose as compared to selecting, requesting, receiving, and rendering assets on an as-needed basis (e.g., rendering an asset exclusively based on the current pose 154).

In some implementations, the immersive audio renderer 122 can render two or more assets based on the predicted pose(s) 156. For example, in some circumstances, there can be significant uncertainty as to which of a set of possible poses the user will move to in the future. To illustrate, in a game environment, the user can be faced with several choices, and the specific choice the user makes can change the asset to be rendered, a future listener pose, or both. In this example, the predicted pose(s) 156 can include multiple poses for a particular future time, and the immersive audio renderer 122 can render one asset based on two or more predicted pose(s) 156, can renderer two or more different assets based on the two or more predicted poses 156, or both. In this example, when the current pose 154 aligns with one of the predicted pose(s) 156, the corresponding rendered asset is used to generate the output audio signal 180.

In some implementations, the immersive audio renderer 122 can render assets in stages, as described with reference to FIG. 8. For example, the immersive audio renderer 122 can perform a first set of operations to localize a sound field representation of the immersive audio environment to a listener location and a second set of operations to rotate the sound field representation of the immersive audio environment to a listener orientation. In some such implementations, the immersive audio renderer 122 can perform only the first set of operations (e.g., localization operation) or only the second set of operations (e.g., rotation operations) based on the predicted pose(s) 156. In such implementations, the remaining operations (e.g., localization or rotation operations) are performed to generate the output audio signal 180 when (or if) one of the predicted pose(s) 156 becomes the current pose 154.

In a particular aspect, a mode or rate of pose prediction by the pose predictor 450 can be related to the pose update parameter(s) 456. For example, the pose predictor 450 can be turned off when the pose update parameter(s) 456 have a particular value. To illustrate, when the contextual movement estimate data 462 indicates that little or no user movement is expected for a particular period of time, the pose update parameter(s) 456 can be set such that the pose sensor(s) 108 are turned off or provide pose data 110 at a low rate and the pose predictor 450 is turned off. Conversely, when the contextual movement estimate data 462 indicates that rapid user movement is expected for a particular period of time, the pose update parameter(s) 456 can be set such that the pose sensor(s) 108 provide pose data 110 at a high rate and the pose predictor 450 generates predicted poses 156. Additionally, or alternatively, the pose predictor 450 can generate predicted pose(s) 156 for times a first distance in the future in a first mode and a second distance in the future in a second mode, where the mode is selected based on the pose update parameter(s) 456.

A technical advantage of adjusting the mode or rate of pose prediction by the pose predictor 450 based on the pose update parameter(s) 456 is that the pose predictor 450 can generate more predicted pose(s) 156 for periods when more movement is expected and fewer predicted pose(s) 156 for periods when less movement is expected. Generating more predicted pose(s) 156 for periods when more movement is expected enables the immersive audio renderer 122 to have a higher likelihood of rendering in advance an asset that will be used to generate the output audio signal 180. For example, the immersive audio renderer 122 can render assets associated with the predicted pose(s) 156 and use a particular one of the rendered assets to generate the output audio signal 180 when the current pose 154 corresponds to the predicted pose used to render the particular asset. In this example, having more predicted poses 156 and corresponding rendered assets means that there is a higher likelihood that the current pose 154 at some point in the future will correspond to one of the predicted poses 156, enabling use of the corresponding rendered asset to generate the output audio signal 180 rather than performing real-time rendering operations. On the other hand, pose prediction and rendering assets based on predicted poses 156 is resource intensive, and can be wasteful if the assets rendered based on the predicted poses 156 are not used. Accordingly, generating fewer predicted pose(s) 156 for periods when less movement is expected enables the immersive audio renderer 122 to conserve resources.

Figure 5:
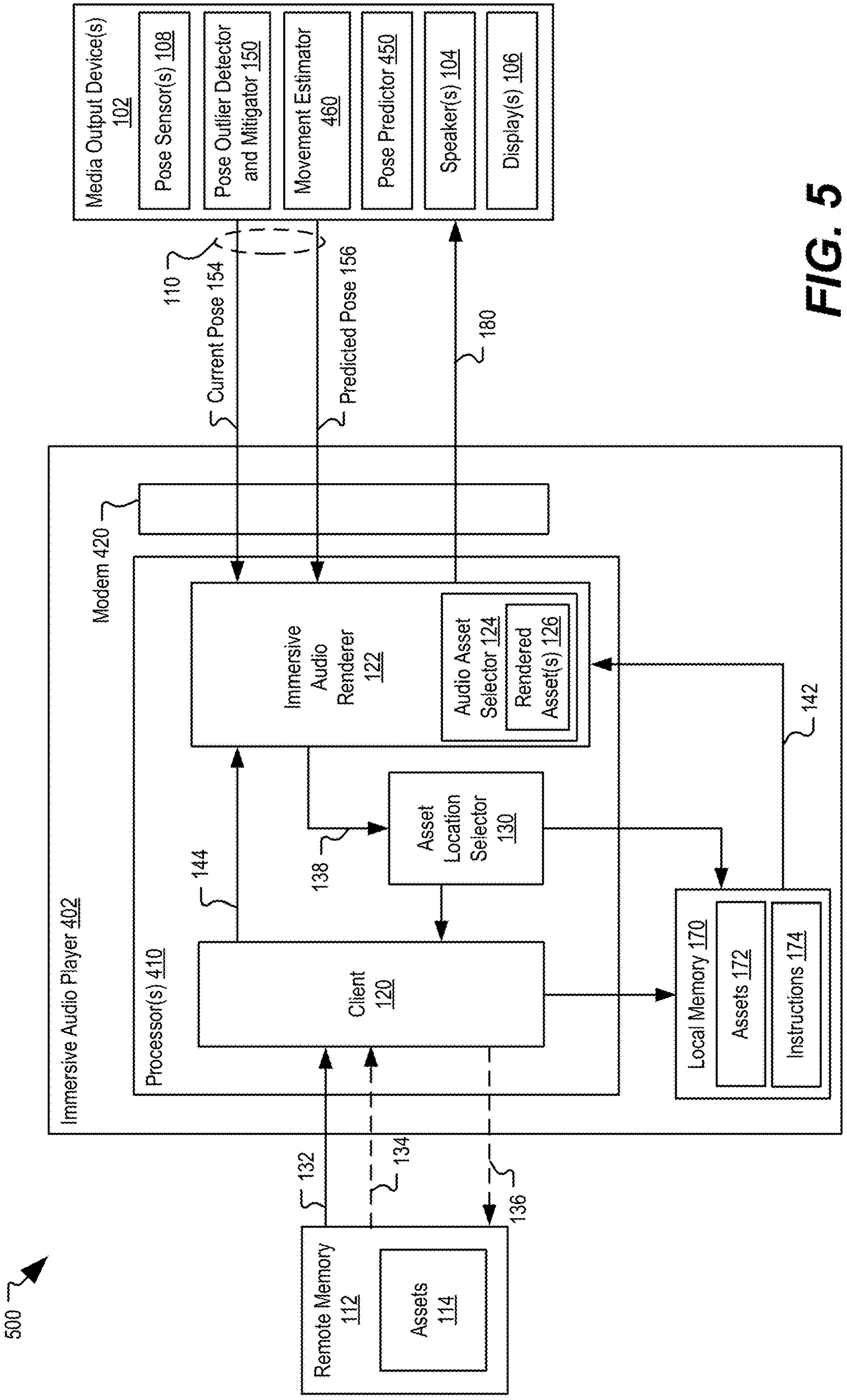
FIG. 5 is a block diagram of aspects of the system of FIG. 1 in accordance with some examples of the present disclosure.

FIG. 5 is a block diagram of a system 500 that includes aspects of the system 100 of FIG. 1. For example, the system 500 includes the immersive audio player 402, the media output device(s) 102, and the remote memory 112. Further, the immersive audio player 402 includes the processor(s) 410, the modem 420, and the local memory 170, and the processor(s) 410 are configured to execute the instructions 174 to perform the operations of the immersive audio renderer 122, the asset location selector 130 and the client 120. Except as described below, the immersive audio player 402, the media output device(s) 102, the remote memory 112, the immersive audio player 402, the processor(s) 410, the modem 420, the local memory 170, the immersive audio renderer 122, the asset location selector 130, and the client 120 of FIG. 5 each operate as described with reference to FIGS. 1-4.

In the system 500, the pose sensor(s) 108, the pose outlier detector and mitigator 150, the pose predictor 450, and the movement estimator 460 are onboard (e.g., integrated within) the media output device(s) 102. To enable the immersive audio renderer 122 to render certain assets before they are needed (e.g., based on predicted pose(s) 156), the pose data 110 of FIG. 5 includes the predicted pose(s) 156 and the current pose 154. The current pose 154 and the predicted pose(s) 156 may be processed by the pose outlier detector and mitigator 150 to detect and mitigate pose outliers prior to being sent to the immersive audio renderer 122 in the pose data 110. As described with reference to FIG. 4, the movement estimator 460 can determine contextual movement estimate data 462 which can be used to set pose update parameter(s) 456 that affect the rate at which the pose sensor(s) 108 send updated pose data 110 to the immersive audio player 402, and optionally can affect operation of the pose predictor 450. As described with reference to FIGS. 1 and 4, setting the pose update parameter(s) 456 based on the contextual movement estimate data 462 can enable conservation of resources and improved user experience.

Figure 6:
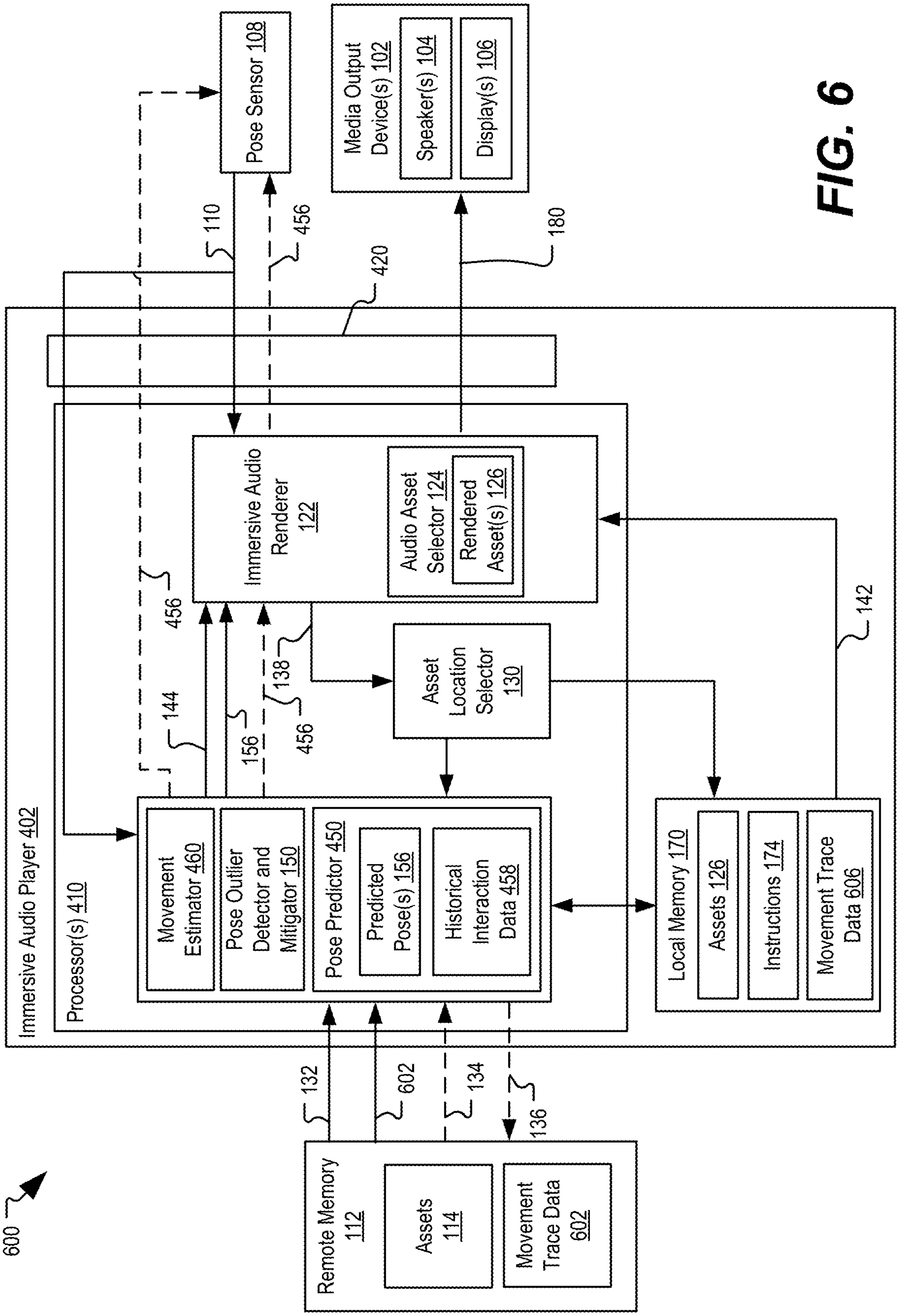
FIG. 6 is a block diagram of aspects of the system of FIG. 1 in accordance with some examples of the present disclosure.

FIG. 6 is a block diagram of a system 600 that includes aspects of the system 100 of FIG. 1. For example, the system 600 includes the immersive audio player 402, the media output device(s) 102, and the remote memory 112. Further, the immersive audio player 402 includes the processor(s) 410, the modem 420, and the local memory 170, and the processor(s) 410 are configured to execute the instructions 174 to perform the operations of the immersive audio renderer 122, the asset location selector 130 and the client 120. Except as described below, the immersive audio player 402, the media output device(s) 102, the remote memory 112, the immersive audio player 402, the processor(s) 410, the modem 420, the local memory 170, the immersive audio renderer 122, the asset location selector 130, and the client 120 of FIG. 6 each operate as described with reference to FIGS. 1 and 4.

FIG. 6 illustrates an example of the system 100 of FIG. 1 in which the pose outlier detector and mitigator 150, the movement estimator 460, and the pose predictor 450 are aspects of the client 120. FIG. 6 also illustrates an example of the system 100 in which the historical interaction data 458 is based on movement trace data 602, movement trace data 606, or both.

As described with reference to FIG. 4, the movement estimator 460 is configured to determine the contextual movement estimate data 462 and to set the pose update parameter(s) 456 based on the contextual movement estimate data 462. In the example illustrated in FIG. 6, the pose update parameter(s) 456 are provided to the pose predictor 450, to the immersive audio renderer 122, to the pose sensor(s) 108, or a combination thereof. As described with reference to FIG. 1, the movement estimator 460 is configured to set the pose update parameter(s) 456 based on the contextual movement estimate data 462. In a particular aspect, a mode or rate of pose prediction by the pose predictor 450 can be related to the pose update parameter(s) 456.

In a particular aspect, the pose predictor 450 is configured to determine the predicted pose(s) 156 using the predictive technique(s) described with reference to FIG. 4. The client 120 provides the predicted pose(s) 156 (e.g., after processing by the pose outlier detector and mitigator 150) to the immersive audio renderer 122. The immersive audio renderer 122 issues asset retrieval requests 138 for assets associated with one or more of the predicted pose(s) 156 and processes retrieved asset(s) associated with the predicted pose(s) 156 to generate rendered asset(s) 126. By using the predicted pose(s) 156 to select and/or render assets, the immersive audio renderer 122 is able to perform many complex rendering operations in advance, leading to reduced latency of providing, via the output audio signal, representing a particular asset and pose as compared to rendering assets on an as-needed basis (e.g., rendering an asset exclusively based on the current pose 154).

In FIG. 6, the movement estimator 460 can use the historical interaction data 458 (optionally, with other information) to determine the contextual movement estimate data 462. Additionally, or alternatively, the pose predictor 450 can use the historical interaction data 458 (optionally, with other information) to determine the predicted pose(s) 156. The historical interaction data 458 can include or correspond to movement trace data associated with the immersive audio environment. For example, the local memory 170 can store the movement trace data 606, which can indicate how a user (or users) of the immersive audio player 402 have moved during playback of the immersive audio environment, during playback of other immersive audio environments, or both. In this example, the movement trace data 606 can include information describing the immersive audio environment (e.g., by title, genre, etc.), specific movements or listener poses detected during playback along with time indices at which such movements or poses were detected, other user interactions (e.g., game inputs) detected during playback and associated time indices, etc.

In some implementations, the movement trace data 602 stored at the remote memory 112 is a copy of (e.g., the same as) the movement trace data 606 stored at the local memory 170. In some implementations, the movement trace data 602 stored at the remote memory 112 includes the same types of information (e.g., data fields) as the movement trace data 606 stored at the local memory 170, but include information describing how users of other immersive audio player device have interacted with the immersive audio environment. For example, the movement trace data 602 can aggregate historical user interaction associated with the immersive audio environment across a plurality of users of the immersive audio player 402 and other immersive audio players.

In implementations in which the movement estimator 460 determines the contextual movement estimate data 462 based on the historical interaction data 458, the historical interaction data 458 can indicate, or be used to determine, movement probability information associated with a particular scene or a particular asset of the immersive audio environment. For example, the movement probability information can indicate how likely a particular movement rate is during a particular portion of the immersive audio environment based on how the user or other users have moved during playback of the particular portion. As another example, the movement probability information can indicate how likely movement of a particular type (e.g., translation in a particular direction, rotation in a particular direction, etc.) is during a particular portion of the immersive audio environment based on how the user or other users have moved during playback of the particular portion. As a result, the movement estimator 460 can set the pose update parameter(s) 456 to prepare for expected movement associated with playback of the immersive audio environment. For example, when the historical interaction data 458 indicates that an upcoming portion of the immersive audio environment has historically been associated with rapid rotation of the listener pose, the movement estimator 460 can set the pose update parameter(s) 456 to increase the rate at which rotation related pose data 110 is provided by the pose sensor(s) 108 to decrease the motion-to-sound latency associated with the playout of the upcoming portion. Conversely, when the historical interaction data 458 indicates that an upcoming portion of the immersive audio environment has historically been associated with little or no change of the listener pose, the movement estimator 460 can set the pose update parameter(s) 456 to decrease the rate at which the pose data 110 is provided by the pose sensor(s) 108 to conserve power and computing resources.

In implementations in which the pose predictor 450 determines the predicted pose(s) 156 based on the historical interaction data 458, the historical interaction data 458 can indicate, or be used to determine, pose probability information associated with a particular scene or a particular asset of the immersive audio environment. For example, the pose probability information can indicate the likelihood of particular listener locations, particular listener orientations, or particular listener poses during playback of a particular portion of the immersive audio environment based on historic listener poses during playback of the particular portion.

A technical benefit of determining the historical interaction data 458 based on the movement trace data 602, 606 is that the movement trace data 602, 606 provides an accurate estimate of how real users interact with the immersive audio environment, thereby enabling more accurate pose prediction, more accurate contextual movement estimation, or both. Further, the movement trace data 602, 606 can be captured readily. To illustrate, during use of the immersive audio player 402 to playout content associated with a particular immersive audio environment, the immersive audio player 402 can store the movement trace data 606 at the local memory 170. The immersive audio player 402 can send the movement trace data 606 to the remote memory 112 to update the movement trace data 602 at any convenient time, such as after playout of the content associated with the particular immersive audio environment is complete or when the immersive audio player 402 is connected to the remote memory 112 and the connection to the remote memory 112 has available bandwidth. The movement trace data 602 can include an aggregation of historical interaction data from a user of the immersive audio player 402 and other users.

Figure 7:
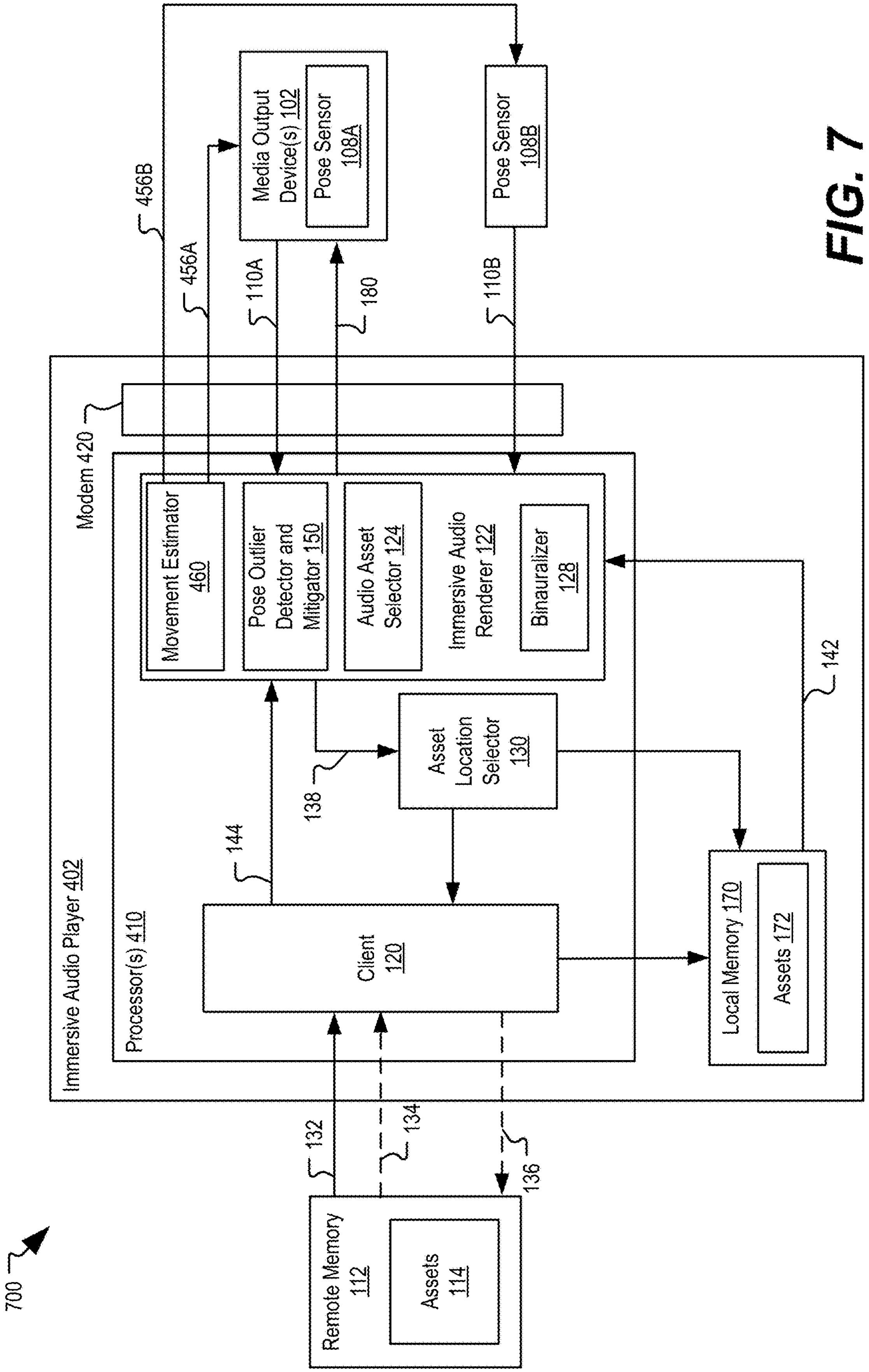
FIG. 7 is a block diagram of aspects of the system of FIG. 1 in accordance with some examples of the present disclosure.

FIG. 7 is a block diagram of a system 700 that includes aspects of the system 100 of FIG. 1. For example, the system 700 includes the immersive audio player 402, the media output device(s) 102, and the remote memory 112. Further, the immersive audio player 402 includes the processor(s) 410, the modem 420, and the local memory 170, and the processor(s) 410 are configured to execute the instructions 174 to perform the operations of the immersive audio renderer 122, the asset location selector 130 and the client 120. Except as described below, the immersive audio player 402, the media output device(s) 102, the remote memory 112, the immersive audio player 402, the processor(s) 410, the modem 420, the local memory 170, the immersive audio renderer 122, the asset location selector 130, and the client 120 of FIG. 7 each operate as described with reference to any of FIGS. 1 and 4-6.

FIG. 7 illustrates an example of the system 100 of FIG. 1 that includes at least two pose sensors 108, e.g., a pose sensor 108A and a pose sensor 108B. In the example illustrated in FIG. 7, the pose sensor 108A is integrated within one of the media output device(s) 102 and the pose sensor 108B is shown external to the media output device(s) 102; however, in other implementations, the pose sensor 108A is integrated within a first of the media output device(s) 102 and the pose sensor 108B is integrated within a second of the media output device(s) 102. For example, the pose sensor 108A can be included in a head-mounted media output device, such as a headset or earbuds, and the pose sensor 108B can be included in a non-head-mounted media output device, such as a game console, a computer, or a smartphone.

In a particular aspect, the pose sensors 108A and 108B are used together to determine a listener pose. For example, in some implementations, the pose sensor 108A provides pose data 110A representing rotation (e.g., a user's head rotation), and the pose sensor 108B provides pose data 110B indicating translation (e.g., a user's body movement). As another example, the pose data 110A can include first translation data, and the pose data 110B can include second translation data. In this example, the first and second translation data can be combined (e.g., subtracted) to determine a change in the listener pose in the immersive audio environment. Additionally, or alternatively, the pose data 110A can include first rotation data, and the pose data 110B can include second rotation data. In this example, the first and second rotation data can be combined (e.g., subtracted) to determine a change in the listener pose in the immersive audio environment.

In the example illustrated in FIG. 7, the movement estimator 460 can set pose update parameter(s) 456A for the pose sensor 108A separately from pose update parameter(s) 456B for the pose sensor(s) 108B. For example, a user's perception of a sound field may change more rapidly due to head rotation than due to translation while seated or walking. Accordingly, it may be desirable to set a higher update rate for pose data 110 indicating rotation than for pose data 110 that indicates translation.

Figure 8:
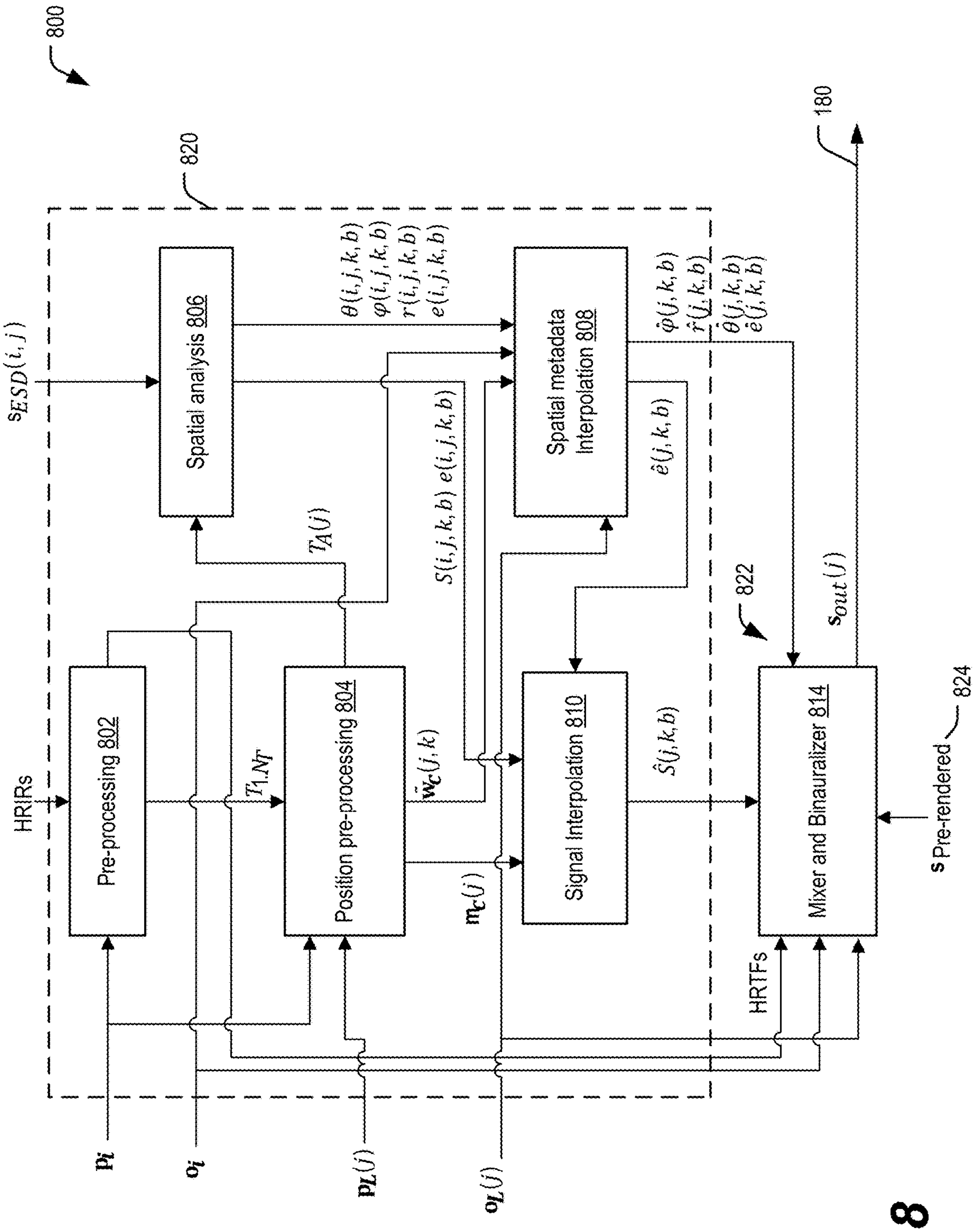
FIG. 8 is a diagram of an illustrative aspect of operation of components of the system of FIG. 1, in accordance with some examples of the present disclosure.

FIG. 8 depicts an example of operations 800 that may be implemented in the immersive audio renderer 122 of any of FIGS. 1 and 4-7. In FIG. 8, the operations are divided between rendering operation 820 and mixing and binauralization operations 822.

In a particular aspect, the mixing and binauralization operations 822 can be performed by a mixer and binauralizer 814 which includes, corresponds to, or is included within the binauralizer 128 of any of FIGS. 1 and 4-7. In FIG. 8, the rendering operations 820 can be performed by one or more of a pre-processing module 802, a position pre-processing module 804, a spatial analysis module 806, a spatial metadata interpolation module 808, and a signal interpolation module 810. In a particular implementation, the operations 800 generate the output audio signal 180, which in FIG. 8 corresponds to a binaural output signal $S_{out}(j)$ based on processing an asset that represents an immersive audio environment using ambisonics representations.

When an asset is received for rendering, the pre-processing module 802 is configured to receive head-related impulse response information (HRIRs) and audio source position information $\mathbf{p}_i$ (where boldface lettering indicates a vector, and where i is an audio source index), such as (x, y, z) coordinates of the location of each audio source in an audio scene. The pre-processing module 802 is configured to generate HRTFs and a representation of the audio source locations as a set of triangles $T_{1 \ldots NT}$ (where $N_T$ denotes the number of triangles) having an audio source at each triangle vertex.

The position pre-processing module 804 is configured to receive the representation of the audio source locations $T_{1 \ldots NT}$, the audio source position information $\mathbf{p}_i$, listener position information $\mathbf{p}_L(j)$ (e.g., x, y, z coordinates) that indicates a listener location for a frame j of the audio data to be rendered. The position pre-processing module 804 is configured to generate an indication of the location of the listener relative to the audio sources, such as an active triangle $T_A(j)$, of the set of triangles, that includes the listener location; an audio source selection indication $m_C(j)$ (e.g., an index of a chosen source (e.g., a higher order ambisonics (HOA) source) for signal interpolation); and spatial metadata interpolation weights $\tilde{w}_c(j, k)$ (e.g., chosen spatial metadata interpolation weights for a subframe k of frame j).

The spatial analysis module 806 receives the audio signals of the audio streams, illustrated as $S_{ESD}(i,j)$ (e.g., an equivalent spatial domain representation of the signals for each source i and frame j) and also receives the indication of the location of the active triangle $T_A(j)$ that includes the listener. The spatial analysis module 806 can convert the input audio signals to an HOA format and generates orientation information for the HOA sources (e.g., θ(i, j, k, b) representing an azimuth parameter for HOA source i for sub-frame k of frame j and frequency bin b, and φ(i, j, k, b) representing an elevation parameter) and energy information (e.g., r(i, j, k, b) representing a direct-to-total energy ratio parameters and e(i, j, k, b) representing an energy value). The spatial analysis module 806 also generates a frequency domain representation of the input audio, such as S(i, j, k, b) representing a time-frequency domain signal of HOA source i.

The spatial metadata interpolation module 808 performs spatial metadata interpolation based on source orientation information $\mathbf{o}_i$, listener orientation information $\mathbf{o}_L(j)$, the HOA source orientation information and energy information from the spatial analysis module 806, and the spatial metadata interpolation weights from the position pre-processing module 804. The spatial metadata interpolation module 808 generates energy and orientation information including $\tilde{e}(i, j, b)$ representing an average (over sub-frames) energy for HOA source i and audio frame j for frequency band b, $\tilde{\theta}(i, j, b)$ representing an azimuth parameter for HOA source i for frame j and frequency bin b, $\tilde{\varphi}(i, j, b)$ representing an elevation parameter for HOA source i for frame j and frequency bin b, and $\tilde{r}(i, j, b)$ representing a direct-to-total energy ratio parameter for HOA source i for frame j and frequency bin b.

The signal interpolation module 810 receives energy information (e.g., $\tilde{e}(i, j, b)$) from the spatial metadata interpolation module 808, energy information (e.g., e(i, j, k, b)) and a frequency domain representation of the input audio (e.g., S(i, j, k, b)) from the spatial analysis module 806, and the audio source selection indication $m_C(j)$ from the position pre-processing module 804. The signal interpolation module 810 generates an interpolated audio signal $\hat{S}(j, k, b)$. Completion of the rendering operation 820 results in a rendered asset (e.g., the rendered asset 126 of any of FIGS. 1 and 4-7) corresponding to the source orientation information oi, the interpolated audio signal $\hat{S}(j, k, b)$, and interpolated orientation and energy parameters from the signal interpolation module 810 and the spatial metadata interpolation module 808.

The mixer and binauralizer 814 receives the source orientation information $o_i$, the listener orientation information $o_L(j)$, the HRTFs, and the interpolated audio signal $\hat{S}(j, k, b)$ and interpolated orientation and energy parameters from the signal interpolation module 810 and the spatial metadata interpolation module 808, respectively. When the asset is a pre-rendered asset 824, the mixer and binauralizer 814 receives the source orientation information $o_i$, the HRTFs, and the interpolated audio signal $\hat{S}(j, k, b)$ and interpolated orientation and energy parameters as part of the pre-rendered asset 824. Optionally, if the listener pose associated with a pre-rendered asset 824 is specified in advance, the pre-rendered asset 824 also includes the listener orientation information $o_L(j)$. Alternatively, if the listener pose associated with a pre-rendered asset 824 is not specified in advance, the pre-rendered asset 824 receives the listener orientation information $o_L(j)$ based on the listener pose.

The mixer and binauralizer 814 is configured to apply one or more rotation operations based on an orientation of each interpolated signal and the listener's orientation; to binauralize the signals using the HRTFs; if multiple interpolated signals are received, to combine the signals (e.g., after binauralization); to perform one or more other operations; or any combination thereof, to generate the output audio signal 180.

Figure 9:
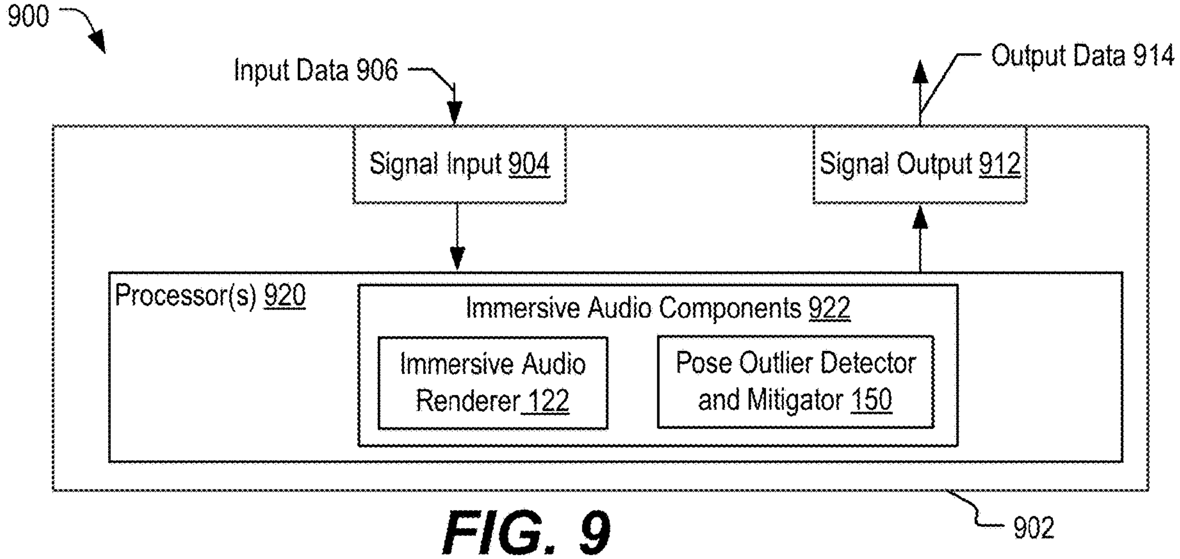
FIG. 9 illustrates an example of an integrated circuit operable to process data associated with an immersive audio environment in accordance with some examples of the present disclosure.

FIG. 9 is a block diagram illustrating an implementation 900 of an integrated circuit 902. The integrated circuit 902 includes one or more processors 920, such as the one or more processors 410. The one or more processors 920 include immersive audio components 922. In FIG. 9, the immersive audio components 922 include the immersive audio renderer 122 and the pose outlier detector and mitigator 150. Optionally, the immersive audio components 922 can include the pose predictor 450, the movement estimator 460, the client 120, the decoder 121, the asset location selector 130, or a combination thereof. Further, optionally, the immersive audio renderer 122 or the pose outlier detector and mitigator 150 can include, be included in, or be coupled to the audio asset selector 124, the pose predictor 450, the movement estimator 460, or a combination thereof. In some implementations, the integrated circuit 902 also includes one or more of the pose sensor(s) 108.

The integrated circuit 902 also includes a signal input 904, such as bus interfaces and/or the modem 420, to enable the processor(s) 920 to receive input data 906, such as a target asset (e.g., a local asset 142 or a remote asset 144), the pose data 110, the historical interaction data 458, the context cue(s) 454, contextual movement estimate data 462, pose update parameter(s) 456, the manifest of assets 134, the audio assets 132, or combinations thereof. The integrated circuit 902 also includes a signal output 912, such as one or more bus interfaces and/or the modem 420, to enable the processor(s) 920 to provide output data 914 to one or more other devices. For example, the output data 914 can include the output audio signal 180, the pose update parameter(s) 456, the asset retrieval request 138, the asset request 136, or combinations thereof.

Figure 10:
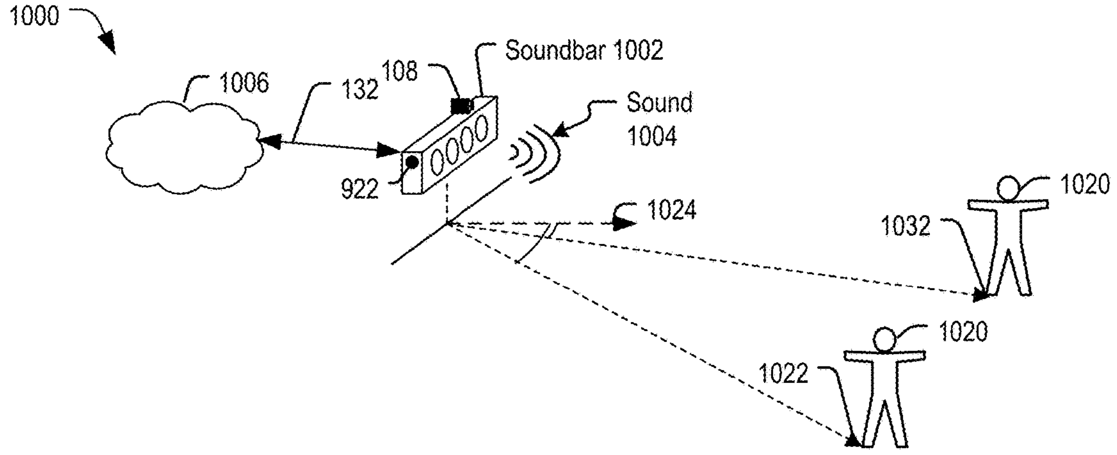
FIG. 10 is a block diagram illustrating an illustrative implementation of a system for processing data associated with an immersive audio environment and including external speakers.
Figure 11:
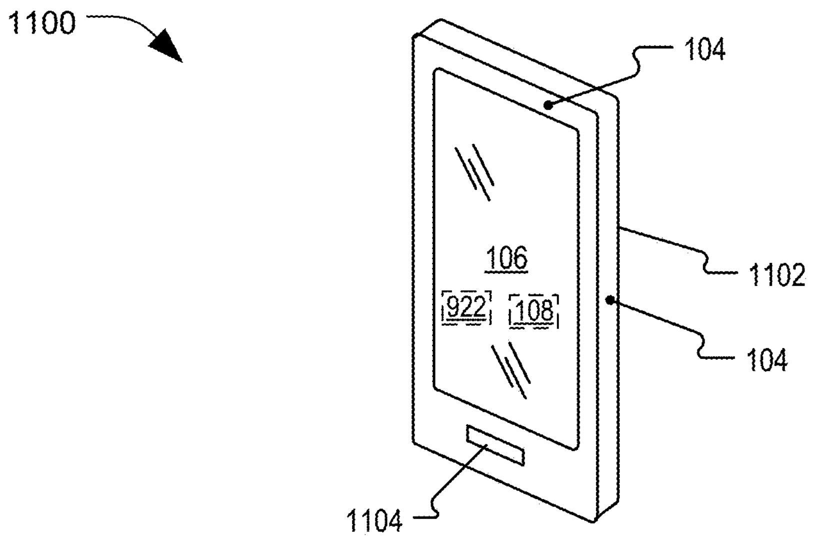
FIG. 11 is a diagram of a mobile device operable to process data associated with an immersive audio environment in accordance with some examples of the present disclosure.
Figure 12:
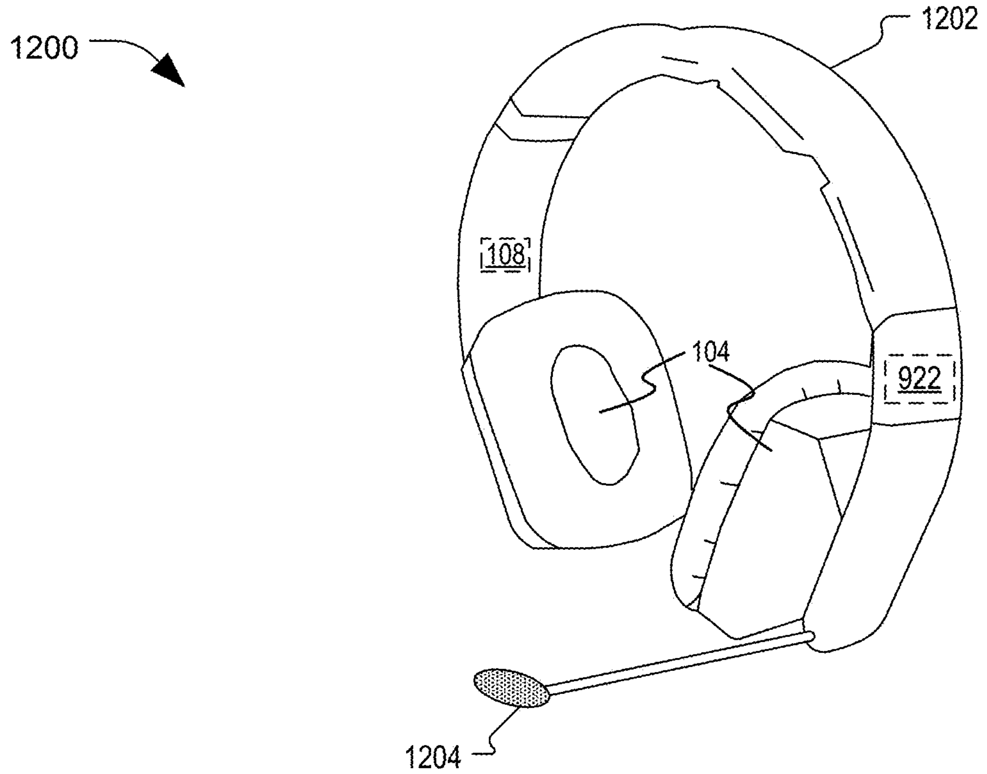
FIG. 12 is a diagram of a headset operable to process data associated with an immersive audio environment in accordance with some examples of the present disclosure.
Figure 13:
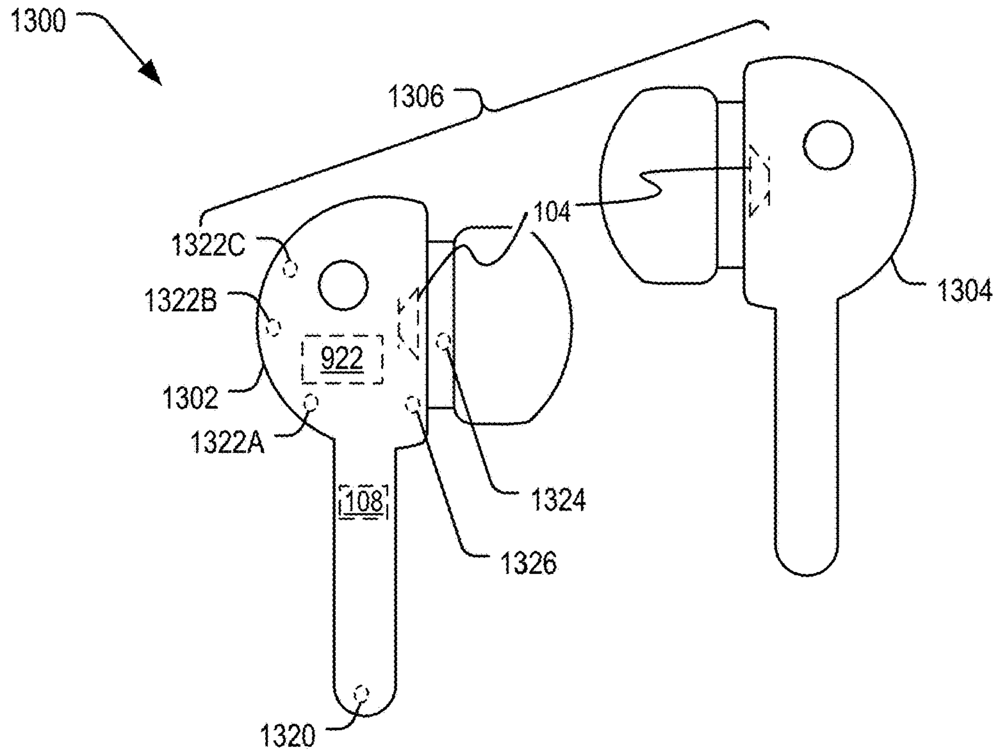
FIG. 13 is a diagram of earbuds that are operable to process data associated with an immersive audio environment in accordance with some examples of the present disclosure.
Figure 14:
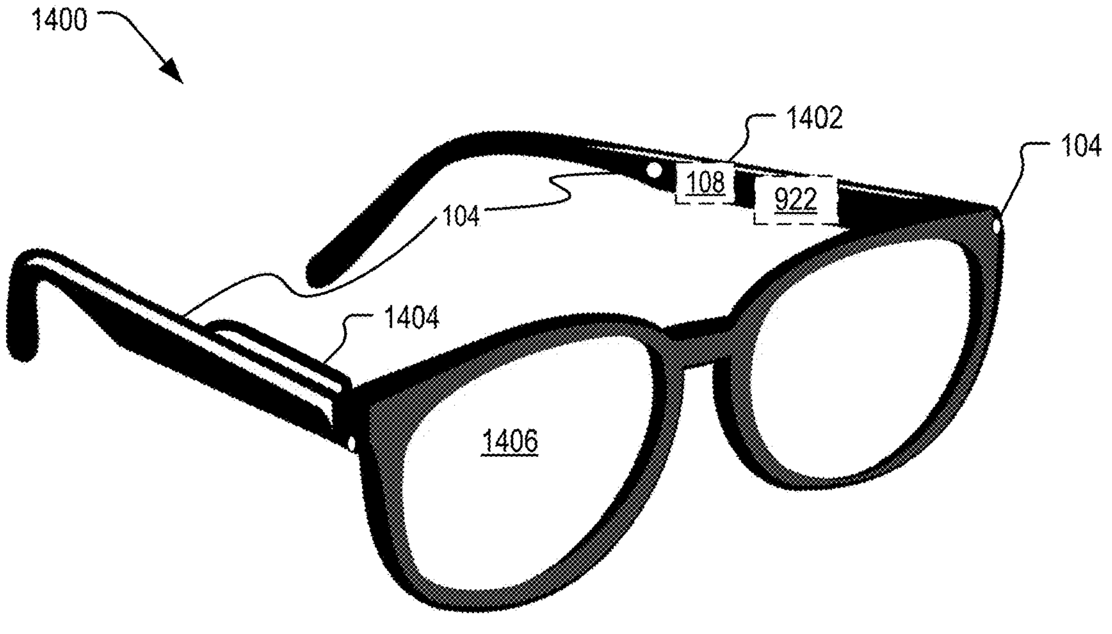
FIG. 14 is a diagram of a mixed reality or augmented reality glasses device that are operable to process data associated with an immersive audio environment in accordance with some examples of the present disclosure.
Figure 15:
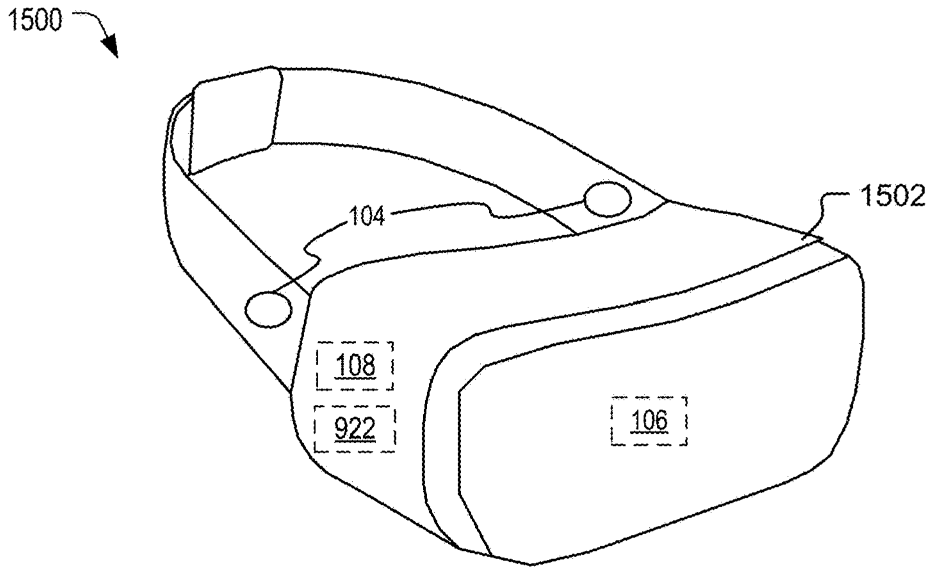
FIG. 15 is a diagram of a headset, such as a virtual reality, mixed reality, or augmented reality headset, operable to process data associated with an immersive audio environment in accordance with some examples of the present disclosure.
Figure 16:
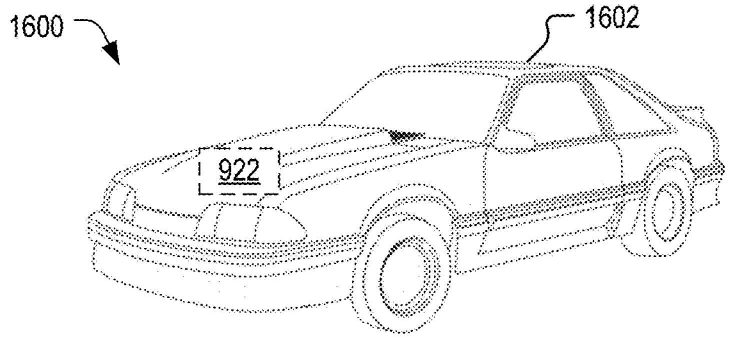
FIG. 16 is a diagram of a first example of a vehicle operable to process data associated with an immersive audio environment in accordance with some examples of the present disclosure.
Figure 17:
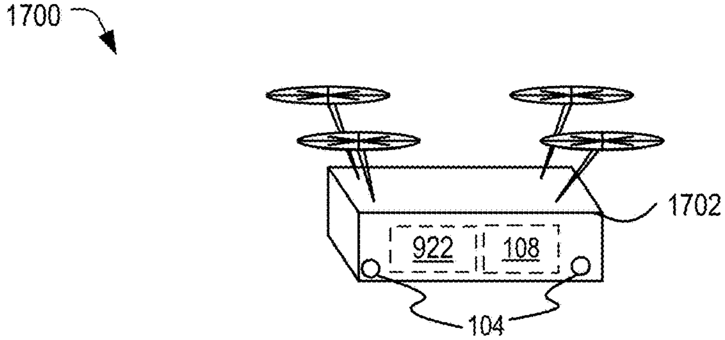
FIG. 17 is a diagram of a second example of a vehicle operable to process data associated with an immersive audio environment in accordance with some examples of the present disclosure.

The integrated circuit 902 enables implementation of immersive audio processing as a component in one of a variety of devices, such as a speaker array as depicted in FIG. 10, a mobile device as depicted in FIG. 11, a headset device as depicted in FIG. 12, earbuds as depicted in FIG. 13, extended reality glasses as depicted in FIG. 14, an extended reality headset as depicted in FIG. 15, or a vehicle as depicted in FIG. 16 or 17.

FIG. 10 is a block diagram illustrating an implementation of a system 1000 for immersive audio processing in which the immersive audio components 922 are integrated within a speaker array, such as a soundbar device 1002. The soundbar device 1002 is configured to perform a beam steering operation to steer binaural signals to a location associated with a user. The soundbar device 1002 may receive audio assets 132 (e.g., ambisonics representations of an immersive audio environment) from a remote streaming server via a wireless network 1006. The soundbar device 1002 may include the one or more processors 920 of FIG. 9 (e.g., including the immersive audio renderer 122, the pose outlier detector and mitigator 150, or both). Optionally, in FIG. 10, the soundbar device 1002 includes or is coupled to the pose sensor(s) 108 to generate pose data 110 which is used to render and binauralize the one or more assets to generate a sound field of the immersive audio environment and to output binaural audio using beam steering operation.

The soundbar device 1002 includes or is coupled to the pose sensors 108 (e.g., cameras, structured light sensors, ultrasound, lidar, etc.) to enable detection of a pose of the listener 1020 and generation of head-tracker data of the listener 1020. For example, the soundbar device 1002 may detect a pose of the listener 1020 at a first location 1022 (e.g., at a first angle from a reference 1024), adjust the sound field based on the pose of the listener 1020, and perform a beam steering operation to cause emitted sound 1004 to be perceived by the listener 1020 as a pose-adjusted binaural signal. In an example, the beam steering operation is based on the first location 1022 and a first orientation of the listener 1020 (e.g., facing the soundbar device 1002). In response to a change in the pose of the listener 1020, such as movement of the listener 1020 to a second location 1032, the soundbar device 1002 adjusts the sound field (e.g., according to a 3 DOF/3 DOF+ or a 6 DOF operation) and performs a beam steering operation to cause the resulting emitted sound 1004 to be perceived by the listener 1020 as a pose-adjusted binaural signal at the second location 1032.

FIG. 11 depicts an implementation 1100 in which a mobile device 1102 is configured to perform immersive audio processing. In FIG. 11, the mobile device 1102 can include, as non-limiting examples, a phone or tablet. In the example illustrated in FIG. 11, the mobile device 1102 includes a microphone 1104, multiple speakers 104, and a display 106. The immersive audio components 922 and optionally one or more pose sensors 108 are integrated in the mobile device 1102 and are illustrated using dashed lines to indicate internal components that are not generally visible to a user of the mobile device 1102. In a particular example, the immersive audio components 922 include the immersive audio renderer 122, the pose outlier detector and mitigator 150, and optionally other components described with reference to FIGS. 1-10. For example, in some implementations, the mobile device 1102 is configured to perform operations described with reference to the immersive audio player 402 of any of FIGS. 4-7. To illustrate, the mobile device 1102 can obtain pose data for a listener in the immersive audio environment, determine a current listener pose based on the pose data and one or more pose constraints, obtain, based on the current listener pose, a rendered asset associated with the immersive audio environment, and generate an output audio signal based on the rendered asset. In such implementations, the output audio signal can be provided to another device, such as the soundbar device 1002 of FIG. 10, the headset of FIG. 12, the earbuds of FIG. 13, the extended reality glasses of FIG. 14, the extended reality headset of FIG. 15, or speakers of one of the vehicles of FIG. 16 or 17. The mobile device 1102 obtains the pose data used to render an asset from the pose sensor 108 of the mobile device 1102, from a pose sensor of another device, or from a combination of pose data from the pose sensor 108 of the mobile device 1102 and pose data from another device.

FIG. 12 depicts an implementation 1200 in which a headset device 1202 is configured to perform immersive audio processing. In the example illustrated in FIG. 12, the headset device 1202 includes the speakers 104, and optionally includes a microphone 1204. The immersive audio components 922 and optionally one or more pose sensors 108 are integrated in the headset device 1202. In a particular example, the immersive audio components 922 include the immersive audio renderer 122, the pose outlier detector and mitigator 150, and optionally other components described with reference to FIGS. 1-10. For example, in some implementations, the headset device 1202 is configured to perform operations described with reference to the immersive audio player 402 of any of FIGS. 4-7. To illustrate, the headset device 1202 can obtain pose data for a listener in the immersive audio environment, determine a current listener pose based on the pose data and one or more pose constraints, obtain, based on the current listener pose, a rendered asset associated with the immersive audio environment, and generate an output audio signal based on the rendered asset.

In some implementations, the headset device 1202 is configured to perform operations described with reference to the media output device(s) 102 of any of FIGS. 1 and 4-7. For example, the headset device 1202 can generate pose data 110 and receive an output audio signal 180 representing immersive audio content rendered based on the pose data 110 after pose outlier detection and mitigation has been performed to ensure that one or more human body movement constraints and/or one or more spatial constraints are not violated. In this example, the headset device 1202 can output sound based on the output audio signal 180.

FIG. 13 depicts an implementation 1300 in which a pair of earbuds 1306 (including a first earbud 1302 and a second earbud 1304) are configured to perform immersive audio processing. Although earbuds are described, it should be understood that the present technology can be applied to other in-ear or over-ear playback devices.

In the example illustrated in FIG. 13, the first earbud 1302 includes a first microphone 1320, such as a high signal-to-noise microphone positioned to capture the voice of a wearer of the first earbud 1302, an array of one or more other microphones configured to detect ambient sounds and spatially distributed to support beamforming, illustrated as microphones 1322A, 1322B, and 1322C, an "inner" microphone 1324 proximate to the wearer's ear canal (e.g., to assist with active noise cancelling), and a self-speech microphone 1326, such as a bone conduction microphone configured to convert sound vibrations of the wearer's ear bone or skull into an audio signal. The second earbud 1304 can be configured in a substantially similar manner as the first earbud 1302.

The immersive audio components 922 and optionally one or more pose sensors 108 are integrated in at least one of the earbuds 1306 (e.g., in the first earbud 1302, the second earbud 1304, or both). In a particular example, the immersive audio components 922 include the immersive audio renderer 122, the pose outlier detector and mitigator 150, and optionally other components described with reference to FIGS. 1-10. For example, in some implementations, the earbuds 1306 are configured to perform operations described with reference to immersive audio player 402 of any of FIGS. 4-7. To illustrate, the earbuds 1306 can obtain pose data for a listener in the immersive audio environment, determine a current listener pose based on the pose data and one or more pose constraints, obtain, based on the current listener pose, a rendered asset associated with the immersive audio environment, and generate an output audio signal based on the rendered asset.

In some implementations, the earbuds 1306 are configured to perform operations described with reference to the media output device(s) 102 of FIG. 1 or any of FIGS. 4-7. For example, the earbuds 1306 can generate pose data 110 and receive an output audio signal 180 representing immersive audio content rendered based on the pose data 110 after pose outlier detection and mitigation has been performed to ensure that one or more human body movement constraints and/or one or more spatial constraints are not violated. In this example, the earbuds 1306 can output sound based on the output audio signal 180 via the speakers 104.

FIG. 14 depicts an implementation 1400 in which extended reality (e.g., augmented reality or mixed reality) glasses 1402 are configured to perform immersive audio processing. The glasses 1402 include a holographic projection unit 1404 configured to project visual data onto a surface of a lens 1406 or to reflect the visual data off of a surface of the lens 1406 and onto the wearer's retina. The immersive audio components 922 and optionally one or more pose sensors 108 are integrated in the glasses 1402. In a particular example, the immersive audio components 922 include the immersive audio renderer 122, the pose outlier detector and mitigator 150, and optionally other components described with reference to FIGS. 1-10. For example, in some implementations, the glasses 1402 are configured to perform operations described with reference to immersive audio player 402 of any of FIGS. 4-7. To illustrate, the glasses 1402 obtain pose data for a listener in the immersive audio environment, determine a current listener pose based on the pose data and one or more pose constraints, obtain, based on the current listener pose, a rendered asset associated with the immersive audio environment, and generate an output audio signal based on the rendered asset.

In some implementations, the glasses 1402 are configured to perform operations described with reference to the media output device(s) 102 of FIG. 1 or any of FIGS. 4-7. For example, the glasses 1402 can generate pose data 110 and receive an output audio signal 180 representing immersive audio content rendered based on the pose data 110 after pose outlier detection and mitigation has been performed to ensure that one or more human body movement constraints and/or one or more spatial constraints are not violated. In this example, the glasses 1402 can output sound based on the output audio signal 180 via the speakers 104.

FIG. 15 depicts an implementation 1500 in which an extended reality (e.g., a virtual reality, mixed reality, or augmented reality) headset 1502 is configured to perform immersive audio processing. In the example illustrated in FIG. 15, the headset 1502 includes the speakers 104 and the display(s) 106. The immersive audio components 922 and optionally one or more pose sensors 108 are integrated in the headset 1502. In a particular example, the immersive audio components 922 include the immersive audio renderer 122, the pose outlier detector and mitigator 150, and optionally other components described with reference to FIGS. 1-10. For example, in some implementations, the headset 1502 is configured to perform operations described with reference to immersive audio player 402 of any of FIGS. 4-7. To illustrate, the headset 1502 can obtain pose data for a listener in the immersive audio environment, determine a current listener pose based on the pose data and one or more pose constraints, obtain, based on the current listener pose, a rendered asset associated with the immersive audio environment, and generate an output audio signal based on the rendered asset.

In some implementations, the headset 1502 is configured to perform operations described with reference to the media output device(s) 102 of FIG. 1 or any of FIGS. 4-7. For example, the headset 1502 can generate pose data 110 and receive an output audio signal 180 representing immersive audio content rendered based on the pose data 110 after pose outlier detection and mitigation has been performed to ensure that one or more human body movement constraints and/or one or more spatial constraints are not violated. In this example, the headset 1502 can output sound based on the output audio signal 180.

FIG. 16 depicts another implementation 1600 in which a vehicle 1602 is configured to perform immersive audio processing. In FIG. 16, the vehicle 1602 is illustrated as a car. The immersive audio components 922 are integrated in the vehicle 1602. In a particular example, the immersive audio components 922 include the immersive audio renderer 122, the pose outlier detector and mitigator 150, and optionally other components described with reference to FIGS. 1-10. For example, in some implementations, the vehicle 1602 is configured to perform operations described with reference to immersive audio player 402 of any of FIGS. 4-7. To illustrate, the vehicle 1602 can obtain pose data for a listener in the immersive audio environment, determine a current listener pose based on the pose data and one or more pose constraints, obtain, based on the current listener pose, a rendered asset associated with the immersive audio environment, and generate an output audio signal based on the rendered asset.

In some implementations, the vehicle 1602 is configured to perform operations described with reference to the media output device(s) 102 of FIG. 1 or any of FIGS. 4-7. For example, the vehicle 1602 can generate pose data 110 and receive an output audio signal 180 representing immersive audio content rendered based on the pose data 110 after pose outlier detection and mitigation has been performed to ensure that one or more human body movement constraints and/or one or more spatial constraints are not violated. In this example, the vehicle 1602 can output sound based on the output audio signal 180 via a set of speakers.

FIG. 17 depicts an implementation 1700 in which a vehicle 1702 is configured to perform immersive audio processing. In FIG. 17, the vehicle 1702 is illustrated as an unmanned aerial vehicle, such as a personal drone or a package delivery drone. The immersive audio components 922 are integrated in the vehicle 1702. In a particular example, the immersive audio components 922 include the immersive audio renderer 122, the pose outlier detector and mitigator 150, and optionally other components described with reference to FIGS. 1-10. For example, in some implementations, the vehicle 1702 is configured to perform operations described with reference to immersive audio player 402 of any of FIGS. 4-7. To illustrate, the vehicle 1702 can obtain pose data for a listener in the immersive audio environment, determine a current listener pose based on the pose data and one or more pose constraints, obtain, based on the current listener pose, a rendered asset associated with the immersive audio environment, and generate an output audio signal based on the rendered asset.

In some implementations, the vehicle 1702 is configured to perform operations described with reference to the media output device(s) 102 of FIG. 1 or any of FIGS. 4-7. For example, the vehicle 1702 can generate pose data 110 and receive an output audio signal 180 representing immersive audio content rendered based on the pose data 110 after pose outlier detection and mitigation has been performed to ensure that one or more human body movement constraints and/or one or more spatial constraints are not violated. In this example, the vehicle 1702 can output sound based on the output audio signal 180 via the speakers 104.

In some implementations, one or both of the vehicles of FIGS. 16, 17 are implemented as, or correspond to, a robotic-type device, such as a radio-controlled (RC) or autonomous aerial device (e.g., a hobbyist quadcopter), land device (e.g., an RC car or robot vacuum cleaner), or aquatic device (e.g., a RC boat or submarine). Such robotic-type device can include one or more cameras to capture a visual scene corresponding to the environment of the device, microphones to capture an audio scene corresponding to the environment of the device, or both. The device may also include one or more pose sensor(s) 108 to track a pose (location and orientation) of the device, and one or more wireless transceivers to send captured audio content, video content, or both, to a remote user and optionally to enable control signals to be received from the remote user. Thus, the remote user may experience, such as via a VR headset, an immersive spatial audio environment and optionally a visual environment of the device as if the remote user were at the location of the device and oriented according to the pose of the device. In some implementations, the camera(s), the microphone(s), or both, are mounted to an adjustable component of the device with one or more degrees of freedom to accommodate rotational orientation changes, inclination angle changes, or both, of the camera(s) and/or the microphone(s) relative to a body of the device. The adjustable component can thus enable an orientation associated with the audio/video capture to be adjusted by a remote user via remote control of the adjustable component, or via autonomous control by the device, without disrupting a body orientation associated with travel of the device.

Figure 18:
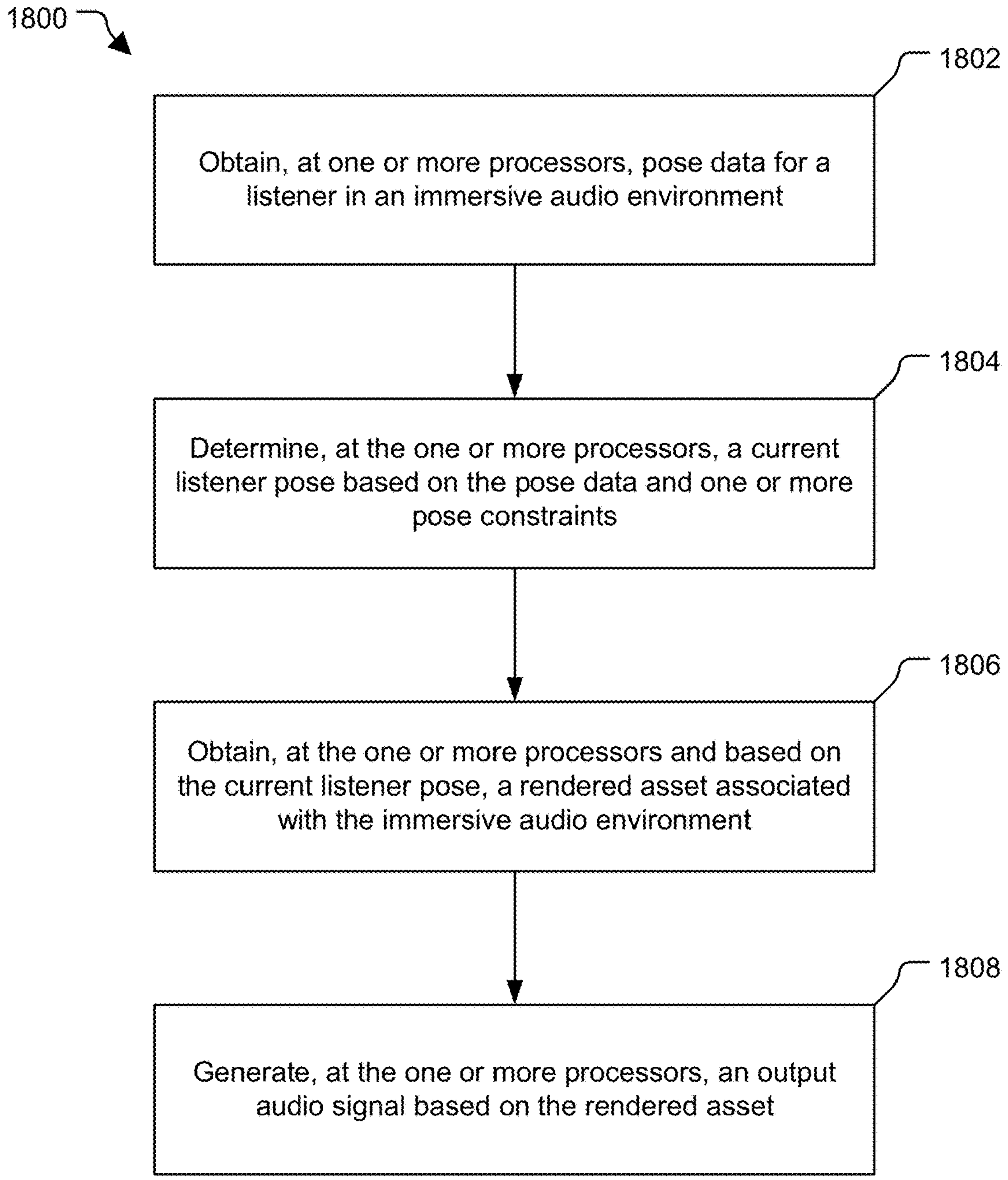
FIG. 18 is a diagram of a particular implementation of a method of processing data associated with an immersive audio environment that may be performed by the device of FIG. 1, in accordance with some examples of the present disclosure.

Referring to FIG. 18, a particular implementation of a method 1800 of processing immersive audio data is shown. In a particular aspect, one or more operations of the method 1800 are performed by one or more of the components of the system 100 of FIG. 1 or any of the systems 400-700 of FIGS. 4-7.

The method 1800 includes, at block 1802, obtaining, at one or more processors, pose data for a listener in an immersive audio environment. The pose data may be received from one or more pose sensors, such as the pose sensor(s) 108. In some implementations, the pose data includes first pose data associated with a head of the listener and second pose data associated with at least one of a torso of the listener or a hand of the listener.

The method 1800 includes, at block 1804, determining, at the one or more processors, a current listener pose based on the pose data and one or more pose constraints. For example, the pose outlier detector and mitigator 150 determines the current pose 154 based on the pose data 110 and the pose constraints 158.

The method 1800 includes, at block 1806, obtaining, at the one or more processors and based on the current listener pose, a rendered asset associated with the immersive audio environment. For example, the immersive audio renderer 122 can perform rendering operations to generate a rendered asset based on a local asset 142 or a remote asset 144. To illustrate, the rendering operations can include one or more of the rendering operations 820 described with reference to FIG. 8. In some implementations, a local asset 142 or a remote asset 144 can include a pre-rendered asset (e.g., one of the pre-rendered assets 114D). As one example, obtaining rendered assets can include determining a target asset based on the pose data (e.g., a predicted pose or the current pose) and generating an asset retrieval request to retrieve the target asset from a storage location. The target asset can include a pre-rendered asset associated with a particular listener pose or an asset that has not been pre-rendered. For example, when the target asset is a pre-rendered asset, generating the output audio signal can include applying head related transfer functions to the target asset to generate a binaural output signal. When the target asset has not been pre-rendered, obtaining the rendered assets can include rendering the target asset based on the pose data to generate a rendered asset, and applying head related transfer functions to the rendered asset to generate a binaural output signal.

The method 1800 also includes, at block 1808, generating, at the one or more processors, an output audio signal based on the rendered asset. For example, the immersive audio renderer 122 can generate the output audio signal 180 based on a rendered asset (e.g., the rendered asset(s) 126). To illustrate, generating the output audio signal 180 can include performing binauralization operations (e.g., by the binauralizer 128) one or more of the mixing and binauralization operations 822 described with reference to FIG. 8.

According to some aspects, the one or more pose constraints include a human body movement constraint. For example, the human body movement constraint can correspond to a velocity constraint, such as the velocity constraint 216 of FIG. 2, an acceleration constraint, such as the acceleration constraint 218, a constraint on a hand or torso pose of the listener relative to a head pose of the listener, such as the relative head/body constraint 220 of FIG. 2, or any combination thereof. According to some aspects, the one or more pose constraints include a boundary constraint, such as one or more of the boundary constraints 222, that indicates a boundary associated with the immersive audio environment, and the current listener pose is determined such that the current listener pose is limited by the boundary.

The method 1800 optionally includes obtaining a pose based on the pose data and determining whether the pose violates at least one of the one or more pose constraints, such as described with reference to the pose outlier detection operations 200 of FIG. 2. The method 1800 may include, based on a determination that the pose does not violate the one or more pose constraints, using the pose as the current listener pose, such as described with reference to the pose outlier mitigation operations 300 of FIG. 3A and the pose outlier mitigation operations 350 of FIG. 3B. In some implementations, the method 1800 includes, based on a determination that the pose violates at least one of the one or more pose constraints, determining the current listener pose based on a prior listener pose that did not violate the one or more pose constraints, such as described with reference to the operation 342 of FIG. 3A. In addition, based on the determination that the pose violates at least one of the one or more pose constraints, a predicted listener pose may be determined based on a prior predicted listener pose associated with the prior listener pose, such as described with reference to the operation 344 of FIG. 3A.

In some implementations, the method 1800 includes, based on a determination that the pose violates at least one of the one or more pose constraints, determining the current listener pose based on an adjustment of the pose to satisfy the one or more pose constraints, such as described with reference to the operation 372 of FIG. 3B. To illustrate, determining the current listener pose may include adjusting a value of the pose to match a threshold associated with a violated pose constraint, such as one or more of the thresholds 306. Based on the determination that the pose violates at least one of the one or more pose constraints, a predicted listener pose may be determined based on a prior predicted listener pose associated with a prior listener pose, and based on a determination that the prior predicted listener pose violates at least one of the one or more pose constraints, determining the predicted listener pose can include adjusting the prior predicted listener pose to match a threshold associated with a violated pose constraint, such as described with reference to the operation 374.

In some implementations, the pose data includes first data indicating a translational position of a listener in the immersive audio environment and second data indicating a rotational orientation of the listener in the immersive audio environment. In such implementations, the first data and the second data can be received from the same device, from different devices, or combinations thereof. For example, the first data can be received from a first device and the second data can be received from a second device distinct from the first device. As another example, first translation data can be obtained from a first device, second translation data can be obtained from a second device distinct from the first device, and the first data indicating the translational position of the listener in the immersive audio environment can be determined based on the first translation data and the second translation data.

In some implementations, the pose data obtained at block 1802 is associated with a first time, and the method 1800 includes determining a predicted listener pose associated with a second time subsequent to the first time. In such implementations, the rendered asset, at block 1806, can include at least one of the rendered assets associated with the predicted listener pose. In some implementations, more than one predicted listener pose for a particular time can be predicted and each predicted listener pose can be used to obtain a rendered asset. For example, the pose data obtained at block 1801 is associated with a first time, and the method 1800 can include determining two or more predicted listener poses associated with a second time subsequent to the first time, obtaining a first rendered asset associated with a first predicted listener pose, and obtaining a second rendered asset associated with a second predicted listener pose. In this example, the method 1800 can also include selectively generating the output audio signal based on either the first rendered asset or the second rendered asset. To illustrate, selectively generating the output audio signal based on either the first rendered asset or the second rendered asset can include obtaining a first target asset associated with the first predicted listener pose, rendering the first target asset to generate the first rendered asset, obtaining a second target asset associated with the second predicted listener pose, rendering the second target asset to generate the second rendered asset, obtaining pose data associated with the second time, and selecting, based on the pose data associated with the second time, the first rendered asset or the second rendered asset for further processing.

The method 1800 of FIG. 18 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1800 of FIG. 18 may be performed by a processor that executes instructions, such as described with reference to FIG. 19.

Figure 19:
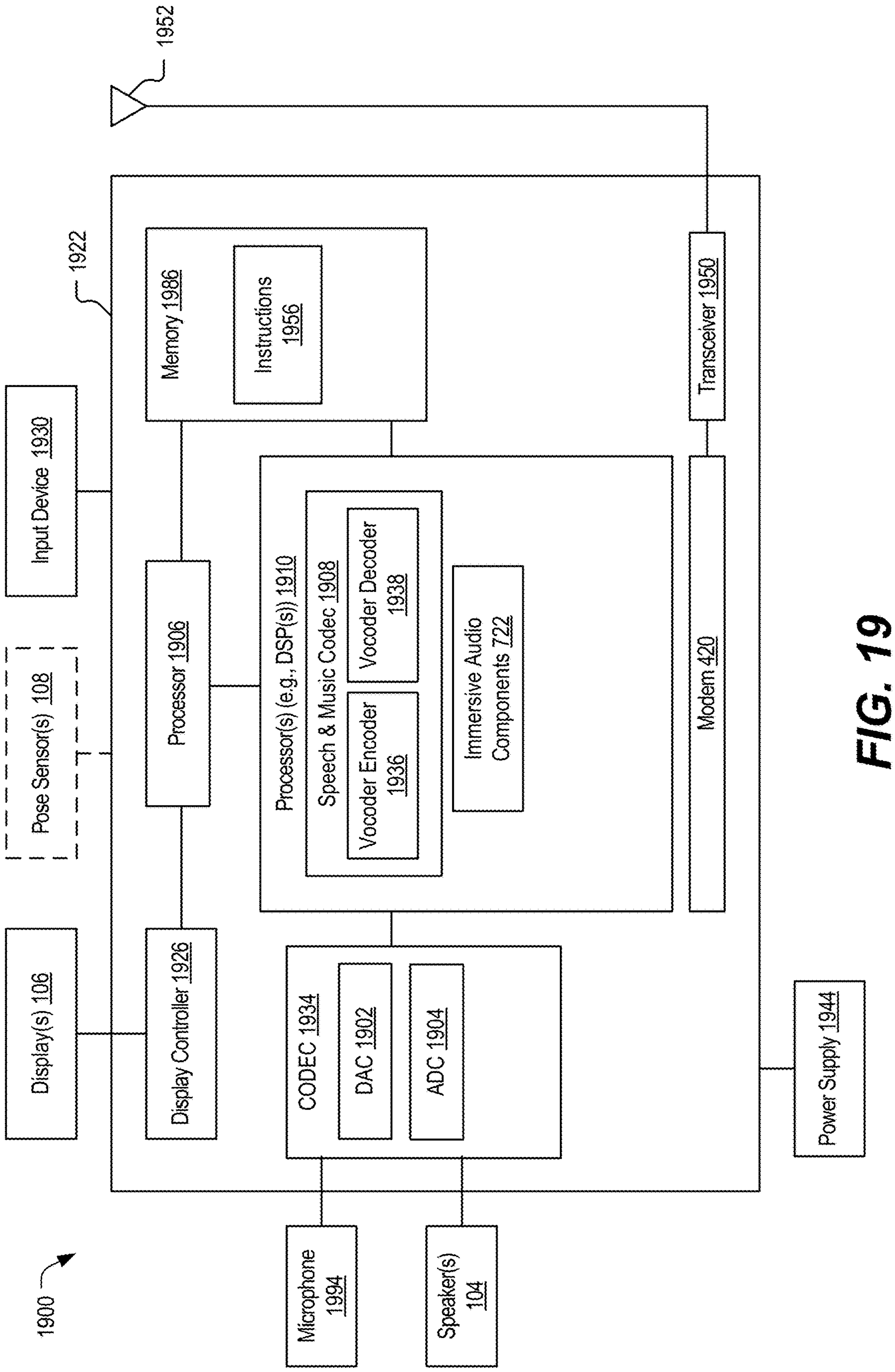
FIG. 19 is a block diagram of a particular illustrative example of a device that is operable to process data associated with an immersive audio environment in accordance with some examples of the present disclosure.

Referring to FIG. 19, a block diagram of a particular illustrative implementation of a device is depicted and generally designated 1900. In various implementations, the device 1900 may have more or fewer components than illustrated in FIG. 19. In an illustrative implementation, the device 1900 may correspond to one or more of the media output device(s) 102, to the immersive audio player 402, or a combination thereof. In an illustrative implementation, the device 1900 may perform one or more operations described with reference to FIGS. 1-18.

In a particular implementation, the device 1900 includes a processor 1906 (e.g., a central processing unit (CPU)). The device 1900 may include one or more additional processors 1910 (e.g., one or more DSPs). In a particular aspect, the processor(s) 410 of any of FIGS. 4-7 correspond to the processor 1906, the processors 1910, or a combination thereof. The processors 1910 may include a speech and music coder-decoder (CODEC) 1908 that includes a voice coder ("vocoder") encoder 1936, a vocoder decoder 1938, the immersive audio components 922, or a combination thereof. The immersive audio components 922 can include, for example, the immersive audio renderer 122 and the pose outlier detector and mitigator 150. Optionally, the immersive audio components 922 can include the pose predictor 450, the movement estimator 460, the client 120, the decoder 121, the asset location selector 130, or a combination thereof. The immersive audio renderer 122, the pose outlier detector and mitigator 150, or the movement estimator 460 can include the audio asset selector 124, the pose predictor 450, or both. Optionally, the pose sensor(s) 108 can be included within or coupled to the device 1900.

The device 1900 may include a memory 1986 and a CODEC 1934. The memory 1986 may include instructions 1956 that are executable by the one or more additional processors 1910 (or the processor 1906) to implement the functionality described with reference to any of FIGS. 1-18. In FIG. 19, the device 1900 also includes the modem 420 coupled, via a transceiver 1950, to an antenna 1952.

The device 1900 may include the display(s) 106 coupled to a display controller 1926. The speaker(s) 104 and a microphone 1994 may be coupled to the CODEC 1934. The CODEC 1934 may include a digital-to-analog converter (DAC) 1902, an analog-to-digital converter (ADC) 1904, or both. In a particular implementation, the CODEC 1934 may receive analog signals from the microphone 1994, convert the analog signals to digital signals using the analog-to-digital converter 1904, and provide the digital signals to the speech and music codec 1908. The speech and music codec 1908 may process the digital signals, and the digital signals or other digital signals (e.g., one or more assets associated with an immersive audio environment) may further be processed by the immersive audio components 922. In a particular implementation, the speech and music codec 1908 may provide digital signals to the CODEC 1934. The CODEC 1934 may convert the digital signals to analog signals using the digital-to-analog converter 1902 and may provide the analog signals to the speaker(s) 104.

In a particular implementation, the device 1900 may be included in a system-in-package or system-on-chip device 1922. In a particular implementation, the memory 1986, the processor 1906, the processors 1910, the display controller 1926, the CODEC 1934, and the modem 420 are included in the system-in-package or system-on-chip device 1922. In a particular implementation, the pose sensor(s) 108, an input device 1930, and a power supply 1944 are coupled to the system-in-package or the system-on-chip device 1922. Moreover, in a particular implementation, as illustrated in FIG. 19, the display(s) 106, the input device 1930, the speaker(s) 104, the microphone 1994, the pose sensor(s) 108, the antenna 1952, and the power supply 1944 are external to the system-in-package or the system-on-chip device 1922. In a particular implementation, each of the display(s) 106, the input device 1930, the speaker(s) 104, the microphone 1994, the pose sensor(s) 108, the antenna 1952, and the power supply 1944 may be coupled to a component of the system-in-package or the system-on-chip device 1922, such as an interface (e.g., the signal input 904 or the signal output 912) or a controller.

The device 1900 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for obtaining pose data for a listener in an immersive audio environment. For example, the means for obtaining pose data can correspond to the pose sensor(s) 108, the pose outlier detector and mitigator 150, the movement estimator 460, the immersive audio renderer 122, the audio asset selector 124, the client 120, the immersive audio player 402, the processor(s) 410, the modem 420, the pose predictor 450, the binauralizer 128, the media output device(s) 102, the processor 1906, the one or more processor(s) 1910, one or more other circuits or components configured to obtain pose data, or any combination thereof.

The apparatus includes means for determining a current listener pose based on the pose data and one or more pose constraints. For example, the means for obtaining the current listener pose can correspond to the pose outlier detector and mitigator 150, the immersive audio renderer 122, the audio asset selector 124, the asset location selector 130, the client 120, the immersive audio player 402, the processor(s) 410, the modem 420, the movement estimator 460, the media output device(s) 102, the processor 1906, the one or more processor(s) 1910, one or more other circuits or components configured to obtain rendered assets, or any combination thereof.

The apparatus includes means for obtaining, based on the current listener pose, a rendered asset associated with the immersive audio environment. For example, the means for obtaining the rendered asset can correspond to the immersive audio renderer 122, the audio asset selector 124, the asset location selector 130, the client 120, the decoder 121, the immersive audio player 402, the processor(s) 410, the modem 420, the binauralizer 128, the media output device(s) 102, the processor 1906, the one or more processor(s) 1910, one or more other circuits or components configured to obtain rendered assets, or any combination thereof.

The apparatus includes means for generating an output audio signal based on the rendered asset. For example, the means for generating an output audio signal can correspond to the immersive audio renderer 122, the immersive audio player 402, the processor(s) 410, the binauralizer 128, the media output device(s) 102, the processor 1906, the one or more processor(s) 1910, one or more other circuits or components configured to generate an output audio signal, or any combination thereof.

In some implementations, a non-transitory computer-readable medium (e.g., a computer-readable storage device, such as the memory 1986 or the local memory 170) includes instructions (e.g., the instructions 1956 or the instructions 174) that, when executed by one or more processors (e.g., the one or more processors 410, the one or more processors 1910 or the processor 1906), cause the one or more processors to obtain pose data for a listener in an immersive audio environment; determine a current listener pose based on the pose data and one or more pose constraints; obtain, based on the current listener pose, a rendered asset associated with the immersive audio environment; and generate an output audio signal based on the rendered asset.

Particular aspects of the disclosure are described below in sets of interrelated Examples:

According to Example 1, a device includes: a memory configured to store audio data associated with an immersive audio environment; and one or more processors configured to: obtain pose data for a listener in the immersive audio environment; determine a current listener pose based on the pose data and one or more pose constraints; obtain, based on the current listener pose, a rendered asset associated with the immersive audio environment; and generate an output audio signal based on the rendered asset.

Example 2 includes the device of Example 1, wherein the one or more pose constraints include a human body movement constraint.

Example 3 includes the device of Example 2, wherein the human body movement constraint corresponds to a velocity constraint.

Example 4 includes the device of Example 2 or Example 3, wherein the human body movement constraint corresponds to an acceleration constraint.

Example 5 includes the device of any of Examples 2 to 4, wherein the human body movement constraint corresponds to a constraint on a hand or torso pose of the listener relative to a head pose of the listener.

Example 6 includes the device of any of Examples 1 to 5, wherein the one or more pose constraints include a boundary constraint that indicates a boundary associated with the immersive audio environment, and wherein the one or more processors are configured to determine the current listener pose such that the current listener pose is limited by the boundary.

Example 7 includes the device of any of Examples 1 to 6, wherein the one or more processors are configured to: obtain a pose based on the pose data; and determine whether the pose violates at least one of the one or more pose constraints.

Example 8 includes the device of Example 7, wherein the one or more processors are configured to, based on a determination that the pose does not violate the one or more pose constraints, use the pose as the current listener pose.

Example 9 includes the device of Example 7 or Example 8, wherein the one or more processors are configured to, based on a determination that the pose violates at least one of the one or more pose constraints, determine the current listener pose based on a prior listener pose that did not violate the one or more pose constraints.

Example 10 includes the device of Example 9, wherein the one or more processors are configured to, based on the determination that the pose violates at least one of the one or more pose constraints, determine a predicted listener pose based on a prior predicted listener pose associated with the prior listener pose.

Example 11 includes the device of Example 7, wherein the one or more processors are configured to, based on a determination that the pose violates at least one of the one or more pose constraints, determine the current listener pose based on an adjustment of the pose to satisfy the one or more pose constraints.

Example 12 includes the device of Example 11, wherein the one or more processors are configured to adjust a value of the pose to match a threshold associated with a violated pose constraint.

Example 13 includes the device of Example 12, wherein the one or more processors are configured to, based on the determination that the pose violates at least one of the one or more pose constraints, determine a predicted listener pose based on a prior predicted listener pose associated with the prior listener pose.

Example 14 includes the device of Example 13, wherein the one or more processors are configured to, based on a determination that the prior predicted listener pose violates at least one of the one or more pose constraints, determine the predicted listener pose based on an adjustment of the prior predicted listener pose to match a threshold associated with a violated pose constraint.

Example 15 includes the device of any of Examples 1 to 14, wherein the pose data is received from one or more pose sensors.

Example 16 includes the device of any of Examples 1 to 15, wherein the pose data includes first pose data associated with a head of a listener and second pose data associated with at least one of a torso of the listener or a hand of the listener.

Example 17 includes the device of Example 16, wherein the first pose data includes head translation data, head rotation data, or both, and wherein the second pose data includes body translation data, body rotation data, or both.

Example 18 includes the device of Example 16 or Example 17, wherein the first pose data is obtained from a first device and wherein the second pose data is received from a second device that is distinct from the first device.

Example 19 includes the device of any of Examples 1 to 18, wherein, to obtain the rendered asset, the one or more processors are configured to: determine a target asset based on the pose data; and generate an asset retrieval request to retrieve the target asset from a storage location.

Example 20 includes the device of Example 19, wherein the memory includes the storage location.

Example 21 includes the device of Example 19, wherein the storage location is at a remote device.

Example 22 includes the device of any of Examples 19 to 21, wherein the target asset is a pre-rendered asset and wherein, to generate the output audio signal, the one or more processors are configured to apply head related transfer functions to the target asset to generate a binaural output signal.

Example 23 includes the device of any of Examples 19 to 21, wherein, to obtain the rendered asset, the one or more processors are configured to render the target asset based on the current listener pose, and wherein, to generate the output audio signal, the one or more processors are configured to apply head related transfer functions to the rendered asset to generate a binaural output signal.

Example 24 includes the device of any of Examples 1 to 23, and further includes a pose sensor coupled to the one or more processors, and wherein the pose sensor is configured to provide at least a portion of the pose data.

Example 25 includes the device of Example 24, wherein the pose sensor and the one or more processors are integrated within a head-mounted wearable device.

Example 26 includes the device of any of Examples 1 to 25, wherein the one or more processors are integrated within an immersive audio player device.

Example 27 includes the device of any of Examples 1 to 26, and further includes a modem coupled to the one or more processors and configured to receive the pose data from a device that includes a pose sensor.

According to Example 28, a method includes: obtaining, at one or more processors, pose data for a listener in an immersive audio environment; determining, at the one or more processors, a current listener pose based on the pose data and one or more pose constraints; obtaining, at the one or more processors and based on the current listener pose, a rendered asset associated with the immersive audio environment; and generating, at the one or more processors, an output audio signal based on the rendered asset.

Example 29 includes the method of Example 28, wherein the one or more pose constraints include a human body movement constraint.

Example 30 includes the method of Example 29, wherein the human body movement constraint corresponds to a velocity constraint.

Example 31 includes the method of Example 29 or Example 30, wherein the human body movement constraint corresponds to an acceleration constraint.

Example 32 includes the method of any of Examples 29 to 31, wherein the human body movement constraint corresponds to a constraint on a hand or torso pose of the listener relative to a head pose of the listener.

Example 33 includes the method of any of Examples 28 to 32, wherein the one or more pose constraints include a boundary constraint that indicates a boundary associated with the immersive audio environment, and wherein the current listener pose is determined such that the current listener pose is limited by the boundary.

Example 34 includes the method of any of Examples 28 to 33, and further includes: obtaining a pose based on the pose data; and determining whether the pose violates at least one of the one or more pose constraints.

Example 35 includes the method of Example 34, and further includes, based on a determination that the pose does not violate the one or more pose constraints, using the pose as the current listener pose.

Example 36 includes the method of Example 34, and further includes, based on a determination that the pose violates at least one of the one or more pose constraints, determining the current listener pose based on a prior listener pose that did not violate the one or more pose constraints.

Example 37 includes the method of Example 36, and further includes, based on the determination that the pose violates at least one of the one or more pose constraints, determining a predicted listener pose based on a prior predicted listener pose associated with the prior listener pose.

Example 38 includes the method of Example 34, and further includes, based on a determination that the pose violates at least one of the one or more pose constraints, determining the current listener pose based on an adjustment of the pose to satisfy the one or more pose constraints.

Example 39 includes the method of Example 38, wherein determining the current listener pose includes adjusting a value of the pose to match a threshold associated with a violated pose constraint.

Example 40 includes the method of Example 38 or Example 39, and further includes, based on the determination that the pose violates at least one of the one or more pose constraints, determining a predicted listener pose based on a prior predicted listener pose associated with a prior listener pose.

Example 41 includes the method of Example 40, wherein, based on a determination that the prior predicted listener pose violates at least one of the one or more pose constraints, determining the predicted listener pose includes adjusting the prior predicted listener pose to match a threshold associated with a violated pose constraint.

Example 42 includes the method of any of Examples 28 to 41, wherein the pose data is received from one or more pose sensors.

Example 43 includes the method of any of Examples 28 to 42, wherein the pose data includes first pose data associated with a head of the listener and second pose data associated with at least one of a torso of the listener or a hand of the listener.

Example 44 includes the method of Example 43, wherein the first pose data includes head translation data, head rotation data, or both, and wherein the second pose data includes body translation data, body rotation data, or both.

Example 45 includes the method of Example 43 or Example 44, wherein the first pose data is obtained from a first device and wherein the second pose data is received from a second device that is distinct from the first device.

Example 46 includes the method of any of Examples 28 to 41, wherein obtaining the rendered asset includes: determining a target asset based on the pose data; and generating an asset retrieval request to retrieve the target asset from a storage location.

Example 47 includes the method of Example 46, wherein the storage location is at a local memory.

Example 48 includes the method of Example 46, wherein the storage location is at a remote device.

Example 49 includes the method of any of Examples 46 to 48, wherein the target asset is a pre-rendered asset and wherein generating the output audio signal includes applying head related transfer functions to the target asset to generate a binaural output signal.

Example 50 includes the method of any of Examples 46 to 48, wherein obtaining the rendered asset further includes rendering the target asset based on the current listener pose, and wherein generating the output audio signal includes applying head related transfer functions to the rendered asset to generate a binaural output signal.

According to Example 51, a non-transitory computer-readable device stores instructions that are executable by one or more processors to cause the one or more processors to: obtain pose data for a listener in an immersive audio environment; determine a current listener pose based on the pose data and one or more pose constraints; obtain, based on the current listener pose, a rendered asset associated with the immersive audio environment; and generate an output audio signal based on the rendered asset.

Example 52 includes the non-transitory computer-readable device of Example 51, wherein the one or more pose constraints include a human body movement constraint.

Example 53 includes the non-transitory computer-readable device of Example 52, wherein the human body movement constraint corresponds to a velocity constraint.

Example 54 includes the non-transitory computer-readable device of Example 52 or Example 53, wherein the human body movement constraint corresponds to an acceleration constraint.

Example 55 includes the non-transitory computer-readable device of any of Examples 52 to 54, wherein the human body movement constraint corresponds to a constraint on a hand or torso pose of the listener relative to a head pose of the listener.

Example 56 includes the non-transitory computer-readable device of any of Examples 51 to 55, wherein the one or more pose constraints include a boundary constraint that indicates a boundary associated with the immersive audio environment, and wherein the current listener pose is determined such that the current listener pose is limited by the boundary.

Example 57 includes the non-transitory computer-readable device of any of Examples 51 to 56, wherein the instructions cause the one or more processors to: obtain a pose based on the pose data; and determine whether the pose violates at least one of the one or more pose constraints.

Example 58 includes the non-transitory computer-readable device of Example 57, wherein, based on a determination that the pose does not violate the one or more pose constraints, the instructions cause the one or more processors to use the pose as the current listener pose.

Example 59 includes the non-transitory computer-readable device of Example 57 or Example 58, wherein, based on a determination that the pose violates at least one of the one or more pose constraints, the instructions cause the one or more processors to determine the current listener pose based on a prior listener pose that did not violate the one or more pose constraints.

Example 60 includes the non-transitory computer-readable device of Example 59, wherein, based on the determination that the pose violates at least one of the one or more pose constraints, the instructions cause the one or more processors to determine a predicted listener pose based on a prior predicted listener pose associated with the prior listener pose.

Example 61 includes the non-transitory computer-readable device of Example 57, wherein, based on a determination that the pose violates at least one of the one or more pose constraints, the instructions cause the one or more processors to determine the current listener pose based on an adjustment of the pose to satisfy the one or more pose constraints.

Example 62 includes the non-transitory computer-readable device of Example 61, wherein, to determine the current listener pose, the instructions cause the one or more processors to adjust a value of the pose to match a threshold associated with a violated pose constraint.

Example 63 includes the non-transitory computer-readable device of Example 61 or Example 62, wherein, based on the determination that the pose violates at least one of the one or more pose constraints, the instructions cause the one or more processors to determine a predicted listener pose based on a prior predicted listener pose associated with a prior listener pose.

Example 64 includes the non-transitory computer-readable device of Example 63, wherein, based on a determination that the prior predicted listener pose violates at least one of the one or more pose constraints, the instructions cause the one or more processors to determine the predicted listener pose based on adjusting the prior predicted listener pose to match a threshold associated with a violated pose constraint.

Example 65 includes the non-transitory computer-readable device of any of Examples 51 to 64, wherein the pose data is received from one or more pose sensors.

Example 66 includes the non-transitory computer-readable device of any of Examples 51 to 65, wherein the pose data includes first pose data associated with a head of the listener and second pose data associated with at least one of a torso of the listener or a hand of the listener.

Example 67 includes the non-transitory computer-readable device of Example 66, wherein the first pose data includes head translation data, head rotation data, or both, and wherein the second pose data includes body translation data, body rotation data, or both.

Example 68 includes the non-transitory computer-readable device of Example 66 or Example 67, wherein the first pose data is obtained from a first device and wherein the second pose data is received from a second device that is distinct from the first device.

Example 69 includes the non-transitory computer-readable device of any of Examples 51 to 68, wherein to obtain the rendered asset, the instructions cause the one or more processors to: determine a target asset based on the pose data; and generate an asset retrieval request to retrieve the target asset from a storage location.

Example 70 includes the non-transitory computer-readable device of Example 69, wherein the storage location is at a local memory.

Example 71 includes the non-transitory computer-readable device of Example 69, wherein the storage location is at a remote device.

Example 72 includes the non-transitory computer-readable device of any of Examples 69 to 71, wherein the target asset is a pre-rendered asset and wherein, to generate the output audio signal, the instructions cause the one or more processors to apply head related transfer functions to the target asset to generate a binaural output signal.

Example 73 includes the non-transitory computer-readable device of any of Examples 69 to 71, wherein the instructions cause the one or more processors to: render the target asset based on the current listener pose to generate a rendered asset; and apply head related transfer functions to the rendered asset to generate a binaural output signal.

According to Example 74, an apparatus includes: means for obtaining pose data for a listener in an immersive audio environment; means for determining a current listener pose based on the pose data and one or more pose constraints; means for obtaining, based on the current listener pose, a rendered asset associated with the immersive audio environment; and means for generating an output audio signal based on the rendered asset.

Example 75 includes the apparatus of Example 74, wherein the one or more pose constraints include a human body movement constraint.

Example 76 includes the apparatus of Example 75, wherein the human body movement constraint corresponds to a velocity constraint.

Example 77 includes the apparatus of Example 75 or Example 76, wherein the human body movement constraint corresponds to an acceleration constraint.

Example 78 includes the apparatus of any of Examples 75 to 77, wherein the human body movement constraint corresponds to a constraint on a hand or torso pose of the listener relative to a head pose of the listener.

Example 79 includes the apparatus of any of Examples 74 to 78, wherein the one or more pose constraints include a boundary constraint that indicates a boundary associated with the immersive audio environment, and wherein the current listener pose is determined such that the current listener pose is limited by the boundary.

Example 80 includes the apparatus of any of Examples 74 to 78, and further includes: means for obtaining a pose based on the pose data; and means for determining whether the pose violates at least one of the one or more pose constraints.

Example 81 includes the apparatus of Example 80, and further includes means for using the pose as the current listener pose based on a determination that the pose does not violate the one or more pose constraints.

Example 82 includes the apparatus of Example 80 or Example 81, and further includes means for determining the current listener pose based on a prior listener pose that did not violate the one or more pose constraints.

Example 83 includes the apparatus of Example 82, and further includes means for determining a predicted listener pose based on a prior predicted listener pose associated with the prior listener pose.

Example 84 includes the apparatus of Example 80, and further includes means for determining the current listener pose based on an adjustment of the pose to satisfy the one or more pose constraints.

Example 85 includes the apparatus of Example 84, wherein the current listener pose is based on an adjustment of a value of the pose to match a threshold associated with a violated pose constraint.

Example 86 includes the apparatus of Example 84 or Example 85, and further includes means for determining a predicted listener pose based on a prior predicted listener pose associated with a prior listener pose.

Example 87 includes the apparatus of Example 86, wherein the means for determining the predicted listener pose includes means for adjusting the prior predicted listener pose to match a threshold associated with a violated pose constraint.

Example 88 includes the apparatus of any of Examples 74 to 87, wherein the pose data is received from one or more pose sensors.

Example 89 includes the apparatus of any of Examples 74 to 88, wherein the pose data includes first pose data associated with a head of the listener and second pose data associated with at least one of a torso of the listener or a hand of the listener.

Example 90 includes the apparatus of Example 89, wherein the first pose data includes head translation data, head rotation data, or both, and wherein the second pose data includes body translation data, body rotation data, or both.

Example 91 includes the apparatus of Example 89 or Example 90, wherein the first pose data is obtained from a first device and wherein the second pose data is received from a second device that is distinct from the first device.

Example 92 includes the apparatus of any of Examples 74 to 91, wherein the means for obtaining the rendered asset associated with the immersive audio environment includes: means for determining a target asset based on the pose data; and means for generating an asset retrieval request to retrieve the target asset from a storage location.

Example 93 includes the apparatus of Example 92, wherein the storage location is at a local memory.

Example 94 includes the apparatus of Example 92, wherein the storage location is at a remote device.

Example 95 includes the apparatus of any of Examples 92 to 94, wherein the target asset is a pre-rendered asset and wherein the means for generating the output audio signal includes means for applying head related transfer functions to the target asset to generate a binaural output signal.

Example 96 includes the apparatus of any of Examples 92 to 94, wherein the means for obtaining the rendered asset associated with the immersive audio environment further includes means for rendering the target asset based on the current listener pose, and wherein the means for generating the output audio signal includes means for applying head related transfer functions to the rendered asset to generate a binaural output signal.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

a memory configured to store audio data associated with an immersive audio environment; and one or more processors configured to:

obtain pose data for a listener in the immersive audio environment;

determine a current listener pose based on the pose data and one or more pose constraints, the current listener pose corresponding to a value of the pose data adjusted based on at least one of the one or more pose constraints being violated;

obtain, based on the current listener pose, a rendered asset associated with the immersive audio environment; and generate an output audio signal based on the rendered asset.

2. The device of claim 1, wherein the one or more pose constraints include a human body movement constraint.

3. The device of claim 2, wherein the human body movement constraint corresponds to a velocity constraint.

4. The device of claim 2, wherein the human body movement constraint corresponds to an acceleration constraint.

5. The device of claim 2, wherein the human body movement constraint corresponds to a constraint on a hand or torso pose of the listener relative to a head pose of the listener.

6. The device of claim 1, wherein the one or more pose constraints include a boundary constraint that indicates a boundary associated with the immersive audio environment, and wherein the one or more processors are configured to determine the current listener pose such that the current listener pose is limited by the boundary.

7. The device of claim 1, wherein the one or more processors are configured to:

obtain a pose based on the pose data; and determine whether the pose violates at least one of the one or more pose constraints.

8. The device of claim 7, wherein the one or more processors are configured to, based on a determination that the pose does not violate the one or more pose constraints, use the pose as the current listener pose.

9. The device of claim 7, wherein the one or more processors are configured to, based on a determination that the pose violates at least one of the one or more pose constraints, determine the current listener pose based on a prior listener pose that did not violate the one or more pose constraints.

10. The device of claim 9, wherein the one or more processors are configured to, based on the determination that the pose violates at least one of the one or more pose constraints, determine a predicted listener pose based on a prior predicted listener pose associated with the prior listener pose.

11. The device of claim 1, wherein the value is adjusted so the pose data no longer violate the one or more pose constraints.

12. The device of claim 1, wherein the pose data includes first pose data associated with a head of a listener and second pose data associated with at least one of a torso of the listener or a hand of the listener.

13. The device of claim 12, wherein the first pose data is obtained from a first device and wherein the second pose data is received from a second device that is distinct from the first device.

14. The device of claim 1, wherein, to obtain the rendered asset, the one or more processors are configured to:

determine a target asset based on the pose data; and generate an asset retrieval request to retrieve the target asset from a storage location.

15. The device of claim 1, further comprising a pose sensor coupled to the one or more processors, and wherein the pose sensor is configured to provide at least a portion of the pose data.

16. The device of claim 15, wherein the pose sensor and the one or more processors are integrated within a head-mounted wearable device.

17. The device of claim 1, wherein the one or more processors are integrated within an immersive audio player device.

18. The device of claim 1, further comprising a modem coupled to the one or more processors and configured to receive the pose data from a device that includes a pose sensor.

19. A method comprising:

obtaining, at one or more processors, pose data for a listener in an immersive audio environment;

determining, at the one or more processors, a current listener pose based on the pose data and one or more pose constraints, the current listener pose corresponding to a value of the pose data adjusted based on at least one of the one or more pose constraints being violated;

obtaining, at the one or more processors and based on the current listener pose, a rendered asset associated with the immersive audio environment; and generating, at the one or more processors, an output audio signal based on the rendered asset.

20. A non-transitory computer-readable device storing instructions that are executable by one or more processors to cause the one or more processors to:

obtain pose data for a listener in an immersive audio environment;

determine a current listener pose based on the pose data and one or more pose constraints, the current listener pose corresponding to a value of the pose data adjusted based on at least one of the one or more pose constraints being violated;

obtain, based on the current listener pose, a rendered asset associated with the immersive audio environment; and generate an output audio signal based on the rendered asset.

* * * * *